United States Patent [19]
Kaufman

[11] Patent Number: 6,029,688
[45] Date of Patent: Feb. 29, 2000

[54] WATER WHEEL FOR PUMPING CHEMICAL TREATMENT INTO WATER STREAM

[76] Inventor: Michael J. Kaufman, 265 Four Seasons Rd., Boswell, Pa. 15531

[21] Appl. No.: 09/140,664

[22] Filed: Aug. 26, 1998

[51] Int. Cl.[7] .................................................. G05D 11/00
[52] U.S. Cl. ................. 137/99; 137/565.12; 137/565.35; 137/625.47; 417/440; 417/375; 417/477.3; 417/477.6; 417/477.7; 141/100; 141/105
[58] Field of Search ....................... 137/99, 565.35, 137/625.47, 569, 565.12; 417/334, 336, 390, 379, 375, 405, 476, 477.3, 477.6, 477.7, 430, 557, 440, 441; 141/100, 105

[56] References Cited

U.S. PATENT DOCUMENTS

| | | | |
|---|---|---|---|
| 280,247 | 6/1883 | See | 137/565.35 |
| 1,703,361 | 4/1929 | Pohl | 137/565.12 |
| 1,888,542 | 6/1932 | Rosberg | 417/440 |
| 3,121,515 | 2/1964 | Johnson et al. . | |
| 3,549,048 | 12/1970 | Goodman . | |
| 3,642,171 | 2/1972 | Ernst . | |
| 3,821,963 | 7/1974 | Olson et al. | 137/99 |
| 4,012,176 | 3/1977 | Drori . | |
| 4,141,467 | 2/1979 | Augustijn et al. . | |
| 4,651,765 | 3/1987 | Beth | 137/99 |
| 5,167,800 | 12/1992 | Ringer et al. . | |
| 5,271,526 | 12/1993 | Williams | 222/16 |
| 5,879,142 | 3/1999 | Kitagawa | 417/440 |

FOREIGN PATENT DOCUMENTS

| | | |
|---|---|---|
| 1060506 | 4/1954 | France . |
| 87672 | 10/1957 | Netherlands . |

*Primary Examiner*—Henry J. Recla
*Assistant Examiner*—Khoa Huynh
*Attorney, Agent, or Firm*—Richard C. Litman

[57] ABSTRACT

The invention is a water wheel supplying energy to a pump. The pump will typically be used to apply chemical treatments to the water stream. Some examples of chemicals to be added are acids or bases to bring the pH to an acceptable level, precipitation aids for suspending metal out of water, coagulants to aid in filtering dissolved solids out of water, flocculants to aid in filtering dissolved ions out of water, chlorine, or coloring to prevent growth of algae.

19 Claims, 28 Drawing Sheets

WATER WHEEL FOR PUMPING CHEMICAL TREATMENT INTO WATER STREAM

BACKGROUND OF THE INVENTION

1. Field of the Invention

The present invention relates to fluid-driven chemical dispensers. Specifically, the invention is a water wheel supplying energy to a pump for applying a chemical to the water.

2. Description of the Related Art

Other inventors have provided various means of dispensing chemicals using wheel-powered dispensers. However, none of these inventions known to the present inventor provide a means of using a water-powered wheel to operate a chemical pump for dispensing a chemical into the water, without the use of electrical power, without relying on high-pressure water, and by using a mechanism as simple as the one developed by the present inventor.

At least three prior inventors have attempted to use water-powered implements to dispense liquids. The first, U.S. Pat. No. 3,549,048, issued to Charles R. Goodman, is a chemical dispensing apparatus for applying fertilizer to a lawn. The apparatus uses a water-powered impeller wheel to operate a piston pump, drawing liquid fertilizer into the impeller chamber so that it is added to the water. The entering water passes through an inlet constriction to increase its velocity. This invention works well when powered by high-pressure water, but will not work with the low-pressure water envisioned by the present inventor.

Second, U.S. Pat. No. 3,642,171, issued to Franz Ernst, describes an apparatus for adding chemicals to liquids comprising a water wheel for measuring the speed of the liquid, connected to a signal generator, which transmits signals to an electromagnetic pump. The signal generator requires electrical power, whereas the present invention is intended to be used where electrical power is unavailable.

Third, U.S. Pat. No. 4,012,176, issued to Mordeki Drori, describes a fluid-driven motor comprising a collapsible tube connected at one end to a source of pressurized fluid, with the pressurized fluid driving a pinch-roller mechanism. The pinch-roller mechanism may be connected to a second flexible tube by a second set of pinch rollers, so that the motor acts to pump the fluid through the second tube. This is contrasted with the present invention's ability to supply power from low-pressure water.

At least two inventors have used water wheels to dispense powder into water. The first, U.S. Pat. No. 5,167,800, issued to Darwin J. Ringer et al., describes an apparatus for treatment of acidic water streams wherein a water wheel drives a chain, supplying power to a gear box connected to the auger of a hopper containing powder. The auger dispenses the powder into the water. The second, French Pat. No. 1,060,506, appears to show a system for adding a powdered chemical to water. The water passes over a water wheel, which is connected by a chain to a grinding wheel at the bottom of a hopper containing the chemical. Although useful for dispensing powders, these inventions provide no means of dispensing liquids, unlike the present invention.

U.S. Pat. No. 3,121,515, issued to Leslie W. Johnson and Harry M. Meinert, describes a hopper for dispensing agricultural chemicals. The hopper attaches to an agricultural implement supported by wheels which roll along the ground. The hopper has a feed roll at the bottom, with the upwardly rotating surface of the roll in contact with the chemical to be disbursed. A gate near the upper surface of the feed roll controls the quantity of chemical distributed. The hopper is powered by a chain connected to the agricultural implement's wheel. While useful for dispensing powdered chemicals from agricultural vehicles, this patent does not describe a means of dispensing liquid chemicals into water.

U.S. Pat. No. 4,144,467, issued to Govert J. P. Augustijn and Jacobus H. Beun, describes an apparatus for dispensing detergent into a washing machine comprising a pair of hydraulic chambers, each chamber having a piston, with the pistons powering a pump for the detergent.

None of the above inventions provides a means of adding a liquid chemical to water where the water is at a low pressure, and where there is no electricity readily available. None of the above inventions and patents, taken either singularly or in combination, is seen to describe the instant invention as claimed. Thus a water wheel for pumping chemical treatment into water stream solving the aforementioned problems is desired.

SUMMARY OF THE INVENTION

The invention is an apparatus for dispensing chemicals into moving water. It comprises a water wheel having a central shaft connected to a pump so that water turning the water wheel powers the pump, dispensing chemicals into the water.

It is frequently necessary to apply chemical treatments to water to put the water in conformance with environmental regulations, or to prevent problems with the water before they occur. One example is adding acids or bases, usually sulfuric acid or caustic soda, to the water to bring the pH close to 7. Alternatively, a precipitation aid can be added to suspend metal particles out of the water. Coagulants such as aluminum clorohydrate combine with small particles to facilitate filtering them out of the water. Flocculants have a positive or negative charge, and combine with particles having the opposite charge to facilitate filtering the particles out of the water. Chlorine can be added to prevent algae or bacteria growth. Lastly, blue dye can be added to block the sunlight needed for algae growth.

At many locations where water must be treated, electricity is not conveniently available. Additionally, electrical equipment is adversely affected by water, making an alternative power source desirable. The present invention therefore uses a water wheel to directly supply power to a pump.

Either an overshot, undershot, or sideshot water wheel may be used with the present invention. Pump selection is limited to those pumps which will stop when the water wheel stops, and which, when stopped, will prevent chemical from flowing through the pump. If chemicals continue to flow into the water when no additional chemical is needed, the results may vary from wasting chemicals to creating an environmental problem where none existed before. A tube pump is therefore one of the best pumps to use with the present invention, because the pressure of the rollers against the tube blocks chemical flow when the rollers are stopped, and because only the inside of the tube is exposed to the chemicals. Other pumps which will work well with the present invention include piston pumps, gear pumps, diaphragm pumps, progressive cavity pumps, rotary vane pumps, flexible impeller pumps, roller pumps, and bellows pumps.

The drive means between the water wheel's central shaft and the pump may take one of four different forms, depending on the type of pump, and the relationship between water wheel speed and pump speed desired. Piston pumps, diaphragm pumps, and bellows pumps require a reciprocating back and forth drive means attached to a piston. The drive means will therefore include a disk mounted concentrically on a rotating shaft, with a cam arm rotatably mounted between the disk and the pump's piston. Other pumps require a rotating drive means. These pumps may be powered by a direct connection to the water wheel's rotating central shaft, by a system of gears connecting between the water wheel's central shaft and the pump, or by a chain and sprocket system with one sprocket attached concentrically to the water wheel, and the other sprocket attached concentrically with the pump's suction means.

The dimensions of the gears or sprockets in the above drive means can be varied to provide the proper mechanical advantage to the pump. For example, a tube pump, which can operate at low speed but requires great force, can use a small gear or sprocket on the water wheel, and a large gear or sprocket on the pump, so that multiple rotations of the wheel are required for a single rotation of the pump. For a roller pump, which must operate at a high speed, the drive system dimensions are reversed so that one rotation of the water wheel provides several rotations of the pump's rotor.

If desired, the pump's output may be regulated by causing a portion of the chemical to recirculate through the pump rather than be dispensed into the water. This is accomplished by attaching a three way diverter valve to the pump's outlet, with one valve outlet leading to the water, and the other outlet leading to the pump's inlet through a one-way valve, such as a ball valve. By turning the diverter valve's handle, chemical output may be changed with a constant wheel speed.

To maximize the speed of the water wheel, the water wheel's inlet should be wide at its entrance, tapering towards the wheel. Because the amount of water traveling through the inlet remains constant at all points in the inlet, the speed of the water must increase in the tapered portion of the inlet, allowing the water to strike the edge of the water wheel at a higher speed.

Accordingly, it is a principal object of the invention to provide an apparatus for dispensing chemicals into water which relies on the energy of the moving water to power the chemical pump.

It is another object of the invention to provide an apparatus for dispensing chemicals into water which does not depend on electricity for operation.

It is a further object of the invention to provide a means of powering several different types of chemical pumps using a water wheel.

Still another object of the invention is to provide a means of controlling the output of chemicals into the water so that only the desired amount of chemical is added to the water.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
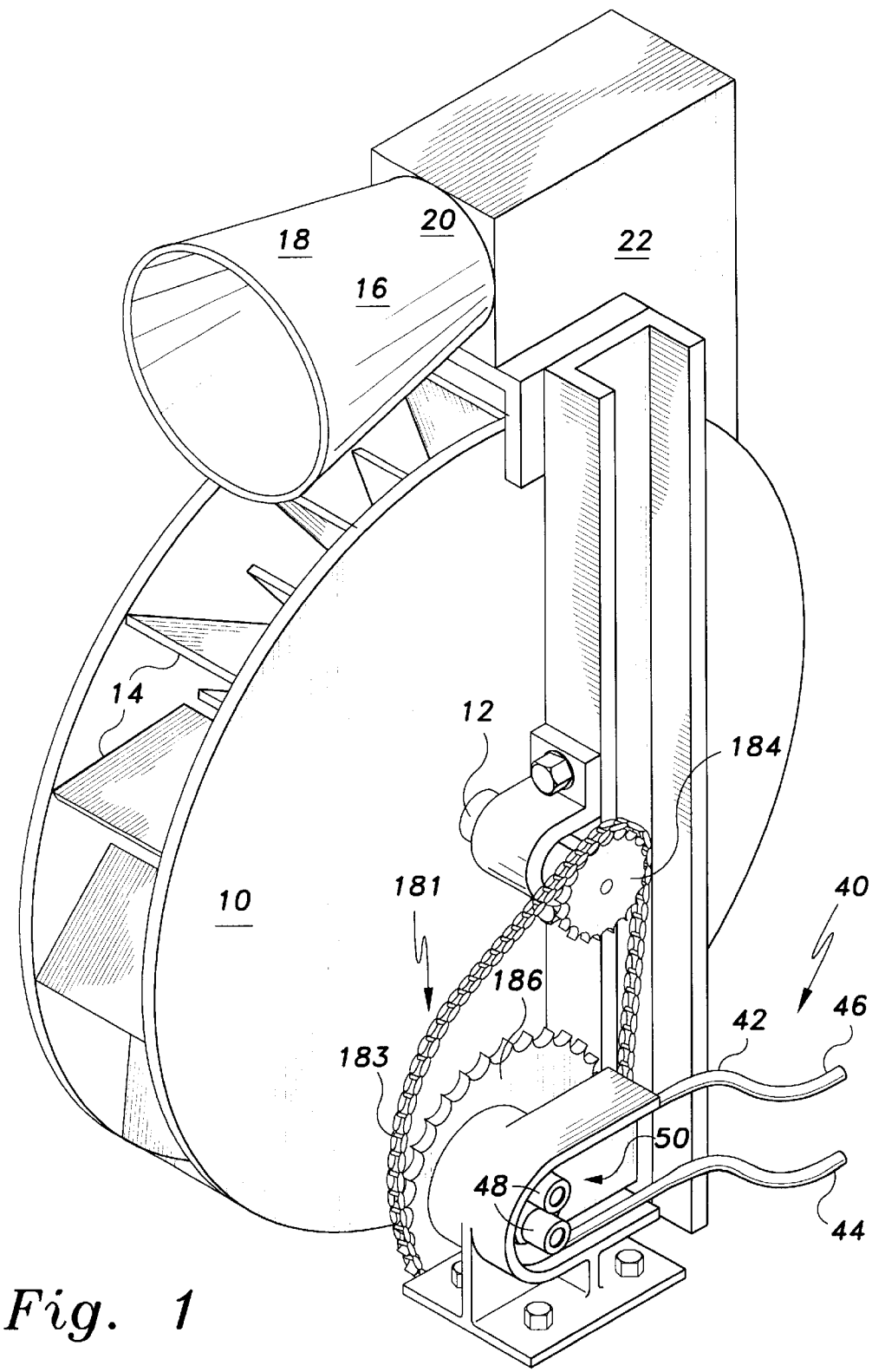
FIG. 1 is a perspective view of a water wheel for pumping chemical treatment into water stream according to the present invention, showing an overshot water wheel and a tube pump.

The present invention is an apparatus for dispensing chemical treatments into water. The invention uses a water wheel to power a chemical pump.

The invention may use either an overshot water wheel, an undershot water wheel, or a sideshot water wheel. Overshot water wheel 10 is shown in FIGS. 1, 2, 3, 4, 13, 16, 19, 22, and 25. Overshot wheel 10 rotates in a substantially vertical plane around horizontal central shaft 12. The wheel 10 includes buckets 14 in close proximity to the outer edge of water wheel 10. Water inlet 16 passes over the top of water wheel 10, giving this water wheel its name. Water inlet 16 begins with wide inlet entrance 18, tapering to a narrow section 20. Because the same volume of water is passing through the entire water inlet 16, the speed of the water at narrow section 20 is greater than the speed of the water at inlet entrance 18. Water flowing through the inlet 16 travels into vertical section 22, where it leaves the inlet and falls into buckets 14 of water wheel 10. The water falling into buckets 14 causes the water wheel to spin, turning central shaft 12.

Undershot water wheel 24 is illustrated in FIGS. 5, 6, 7, 8, 14, 17, 20, 23, and 26. Undershot wheel 24 rotates in a substantially vertical plane around horizontal central shaft 12. Wheel 24 includes blades 26 in close proximity to the outer edge of wheel 24. Water path 28 is directly beneath wheel 24, giving the undershot water wheel its name. At any given time, at least some of blades 26 will be within water path 28. Water moving through water path 28 will push against blades 26, turning wheel 24, thereby turning central shaft 12.

Sideshot water wheel 30 is shown in FIGS. 9, 10, 11, 12, 15, 18, 21, 24, and 27. Sideshot wheel 30 rotates within a substantially horizontal plane around central vertical shaft 32. Sideshot wheel 30 includes blades 34 in close proximity to the edge of wheel 30. Water path 36 is directly alongside sideshot wheel 30, giving wheel 30 its name. At any given time, some of blades 34 are contained within water path 36. To ensure that all water is directed against blades 34, both water path 36 and sideshot wheel 30 are completely enclosed by housing 38. Water passing through water path 36 pushes against blades 34, rotating wheel 30, thereby rotating vertical central shaft 32.

Any of the above water wheels may be used with any pump which will stop pumping immediately when the water wheel stops turning, and which, when it is not pumping, will prevent the flow of chemicals through the pump. Preferable pumps include a tube pump, piston pump, gear pump, diaphragm pump, progressive cavity pump, rotary vane pump, flexible impeller pump, roller pump, and bellows pump. For any of these pumps, the pump inlet will typically be connected to a liquid chemical storage tank, and the outlet will typically be connected to the water flowing past the water wheel, thereby treating the water with the chemical as the water flows past the wheel.

A tube pump 40 is illustrated in FIGS. 1, 5, 9, and 28. The liquid being pumped travels through tube 42, having inlet 44 and outlet 46. Rollers 48 compress the tube 42, completely closing tube 42 at their points of contact. Rollers 48 are mounted on rotor 50, best illustrated in FIG. 28. As rotor 50 rotates, rollers 48 push liquid ahead of them in the tube 42, and the expanding of the tube as roller pressure is removed creates suction behind the rollers, forcing liquid through the pump. When the pump is not in use, the rollers 48, which completely close off tube 42, prevent any fluid from flowing through tube 42.

Figure 2:
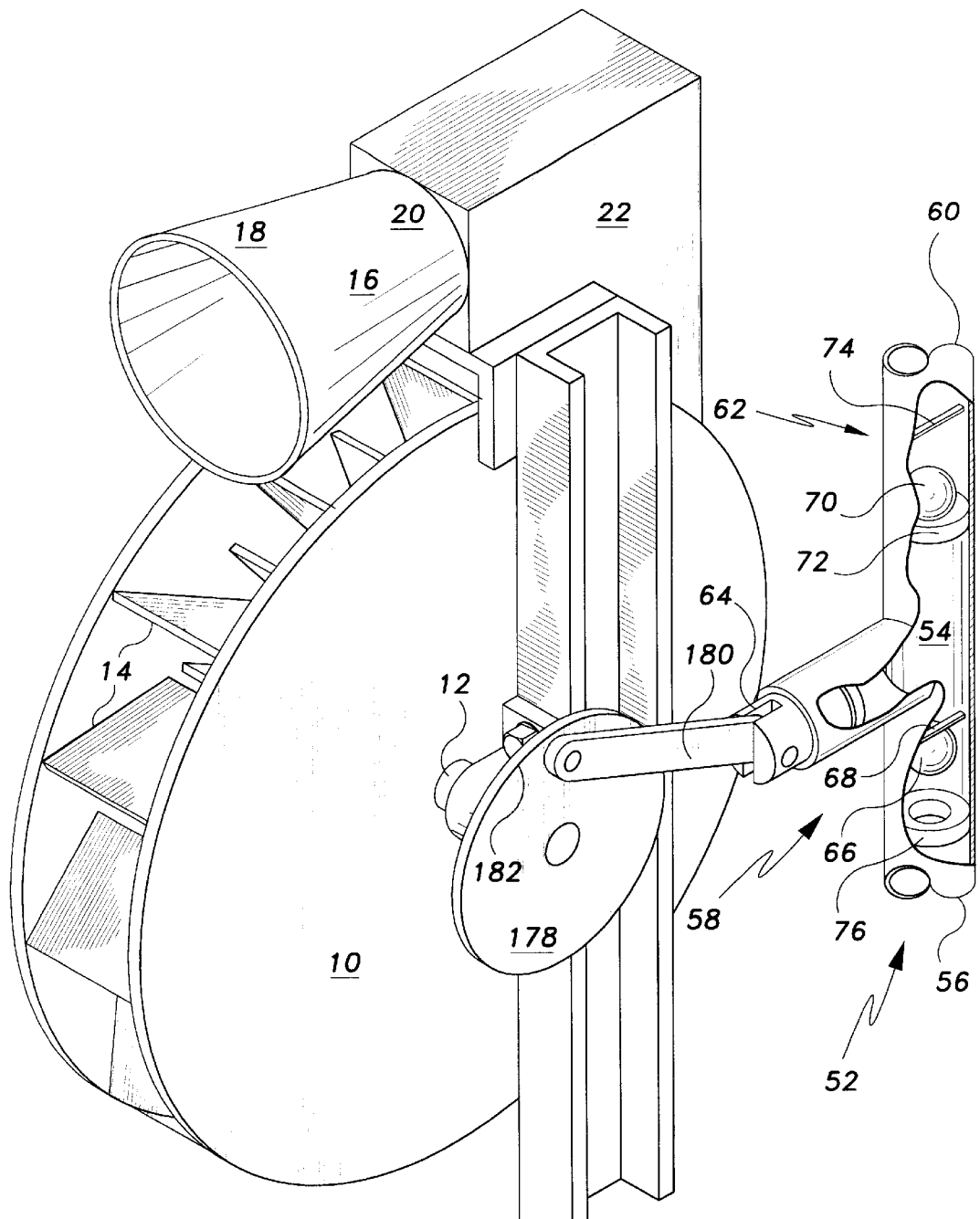
FIG. 2 is a cutaway perspective view of an overshot water wheel powering a piston pump.
Figure 6:
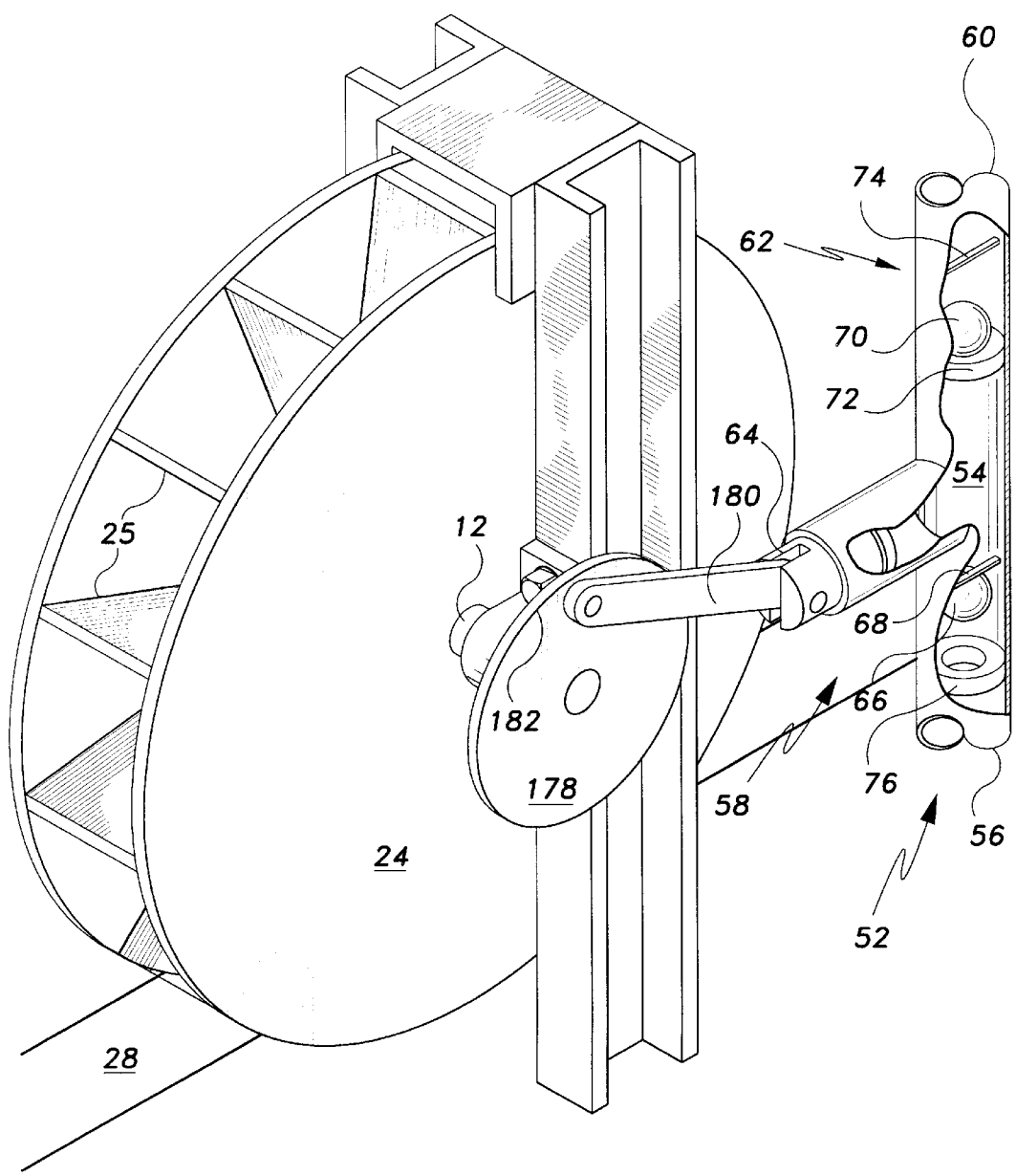
FIG. 6 is a cutaway perspective view of an undershot water wheel powering a piston pump.
Figure 10:
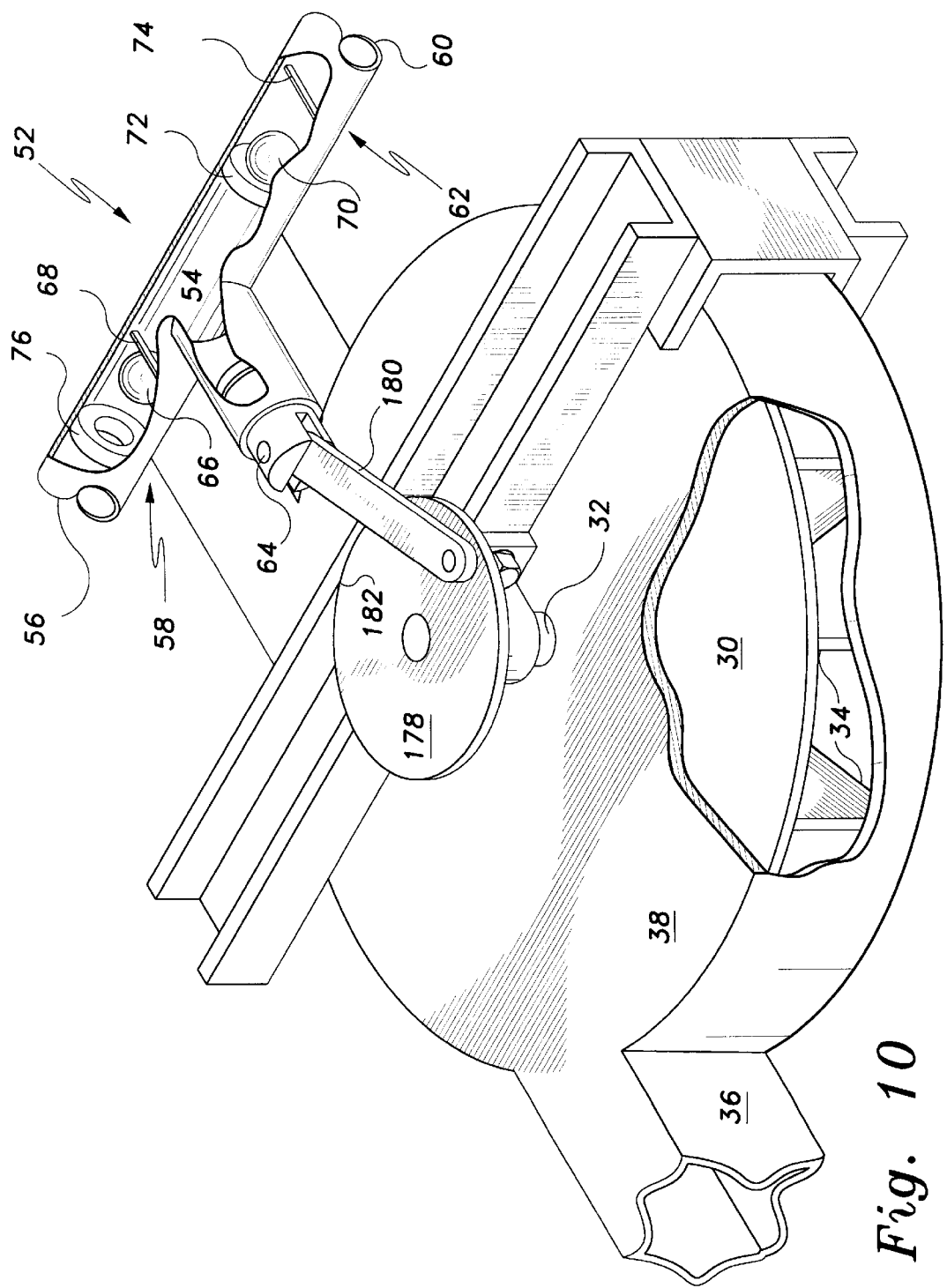
FIG. 10 is a cutaway perspective view of a sideshot water wheel powering a piston pump.

A piston pump 52 is illustrated in FIGS. 2, 6, and 10. Piston pump 52 comprises chamber 54, inlet 56 having one-way ball valve 58, outlet 60 having one-way ball valve 62, and piston 64. As piston 64 is drawn away from chamber 54, it creates suction. Liquid enters through inlet 56. Ball 66 of valve 58 is drawn against stop 68, opening valve 56. At the same time, ball 70 of valve 62 is drawn against ring 72, preventing fluid flow from the outlet. As piston 64 is drawn towards chamber 54, it forces liquid out through outlet 60. Ball 70 of valve 62 is pushed against stop 74, allowing liquid to exit. At the same time, ball 66 of valve 58 is forced against stop 76, preventing liquid from exiting through the inlet.

Figure 3:
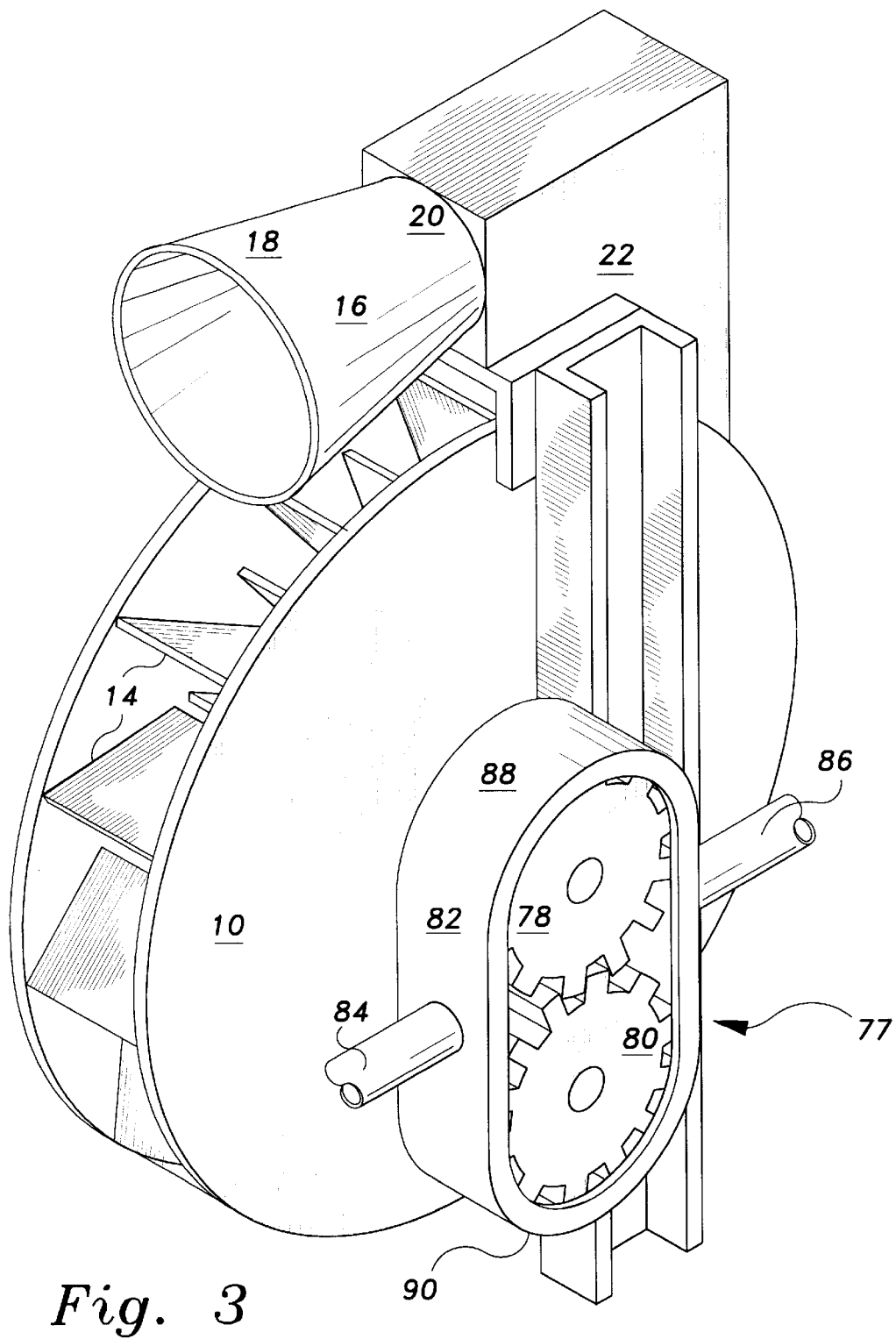
FIG. 3 is a cutaway perspective view of an overshot water wheel powering a gear pump.
Figure 7:
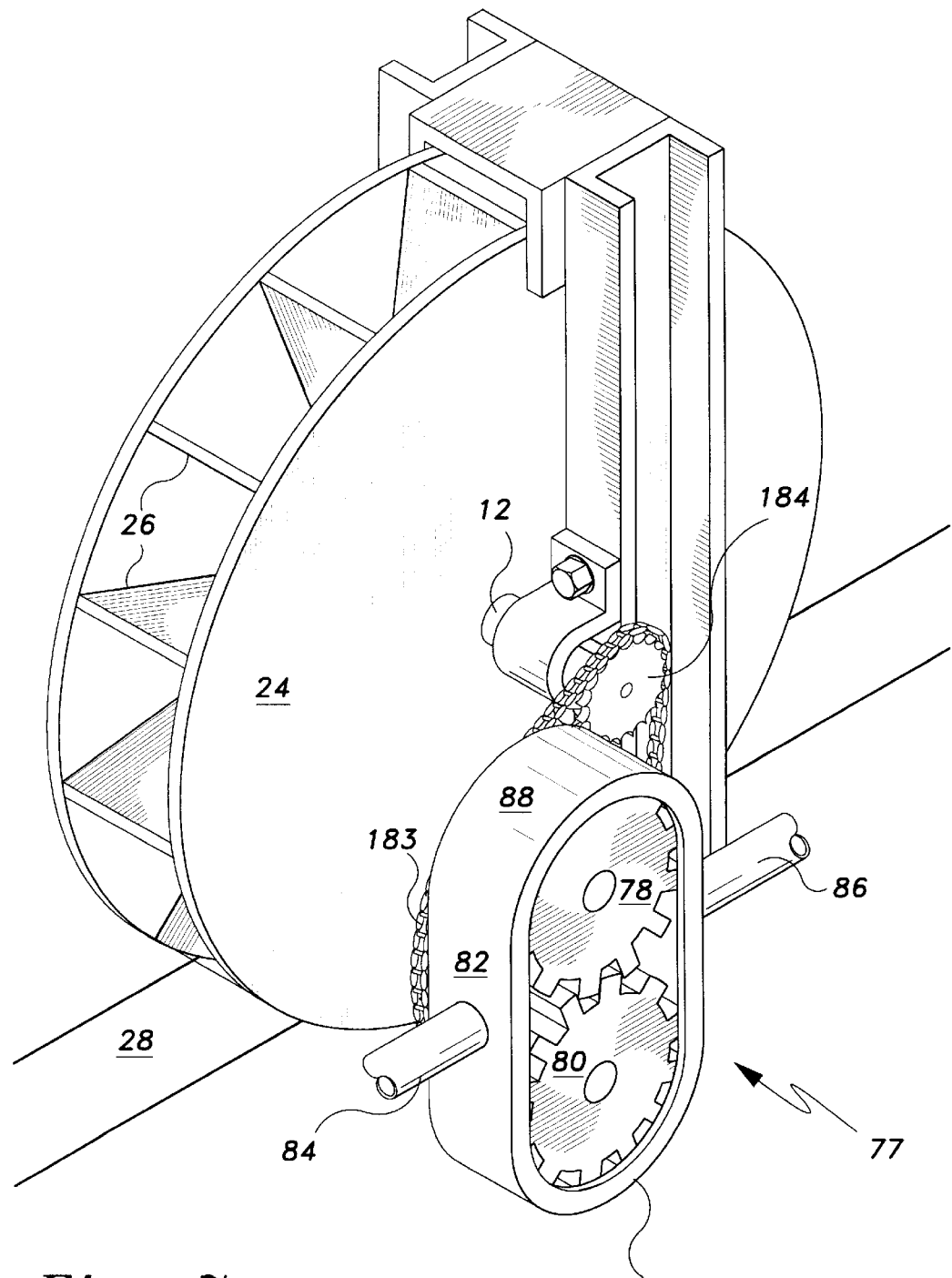
FIG. 7 is a cutaway perspective view of an undershot water wheel powering a gear pump.
Figure 11:
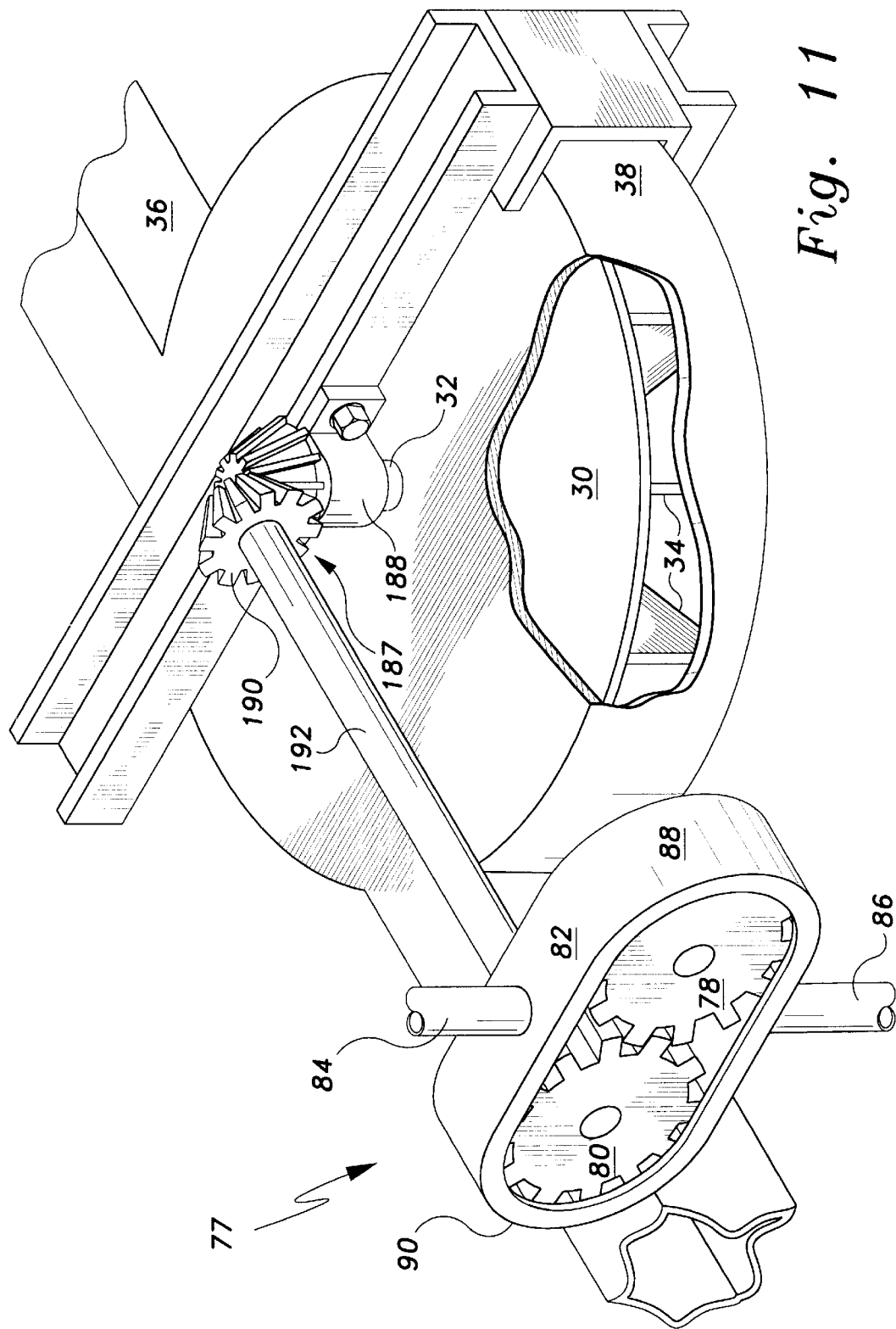
FIG. 11 is a cutaway perspective view of a sideshot water wheel powering a gear pump.

A gear pump 77 is illustrated in FIGS. 3, 7, and 11. For clarity, the pump has been drawn with its front panel removed so that the gears are visible. The gear pump comprises upper gear 78, lower gear 80, housing 82, inlet 84, and outlet 86. Upper gear 78 rotates clockwise, and lower gear 80 rotates counterclockwise. The rotation of the gears forces liquid to travel between the upper gear 78 and the top 88 of housing 82, and between the lower gear 80 and bottom 90 of housing 82. When the gears are not moving, there is no space between gear 78, gear 80, and housing 82, preventing the flow of liquid.

Figure 4:
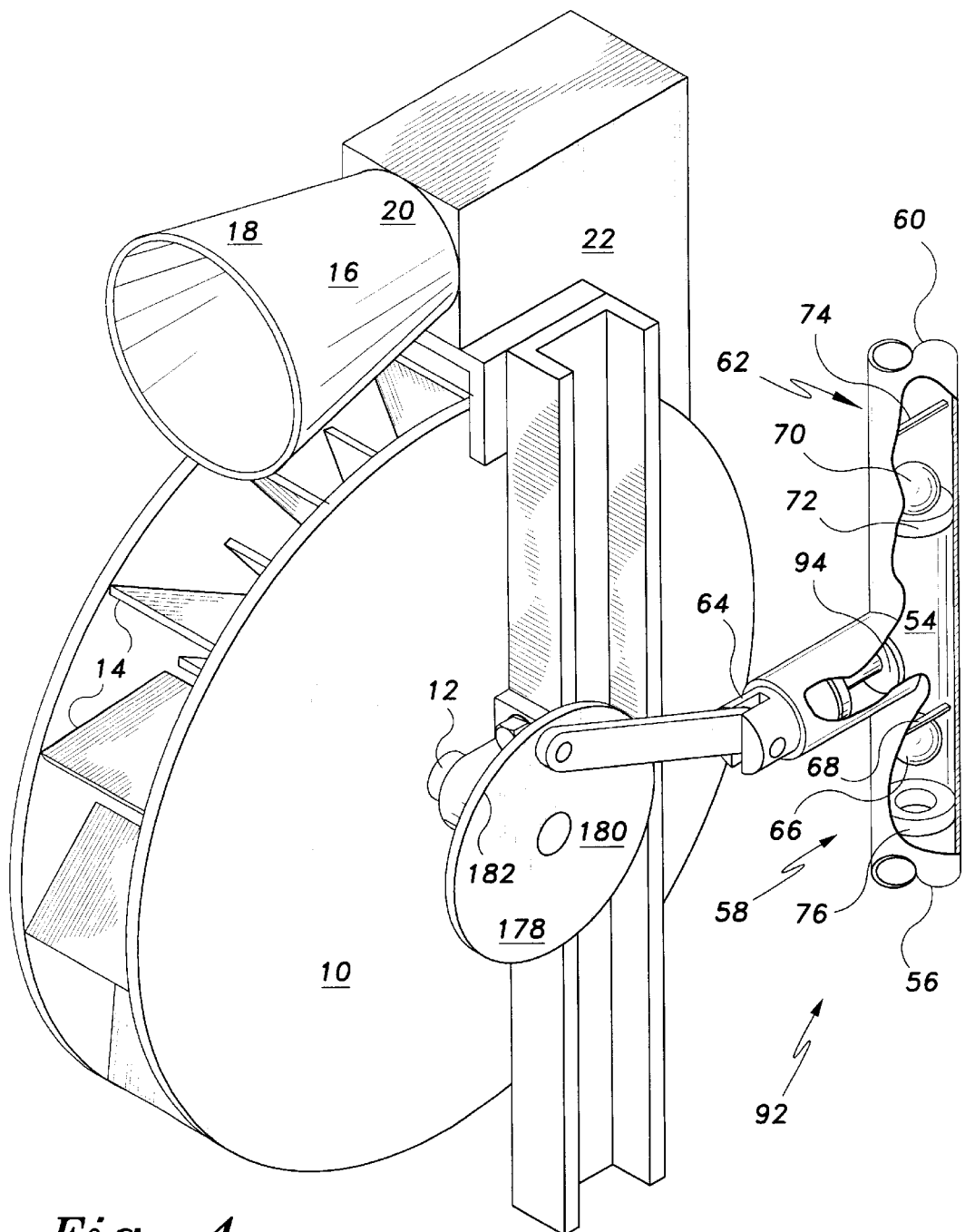
FIG. 4 is a cutaway perspective view of an overshot water wheel powering a diaphragm pump.
Figure 5:
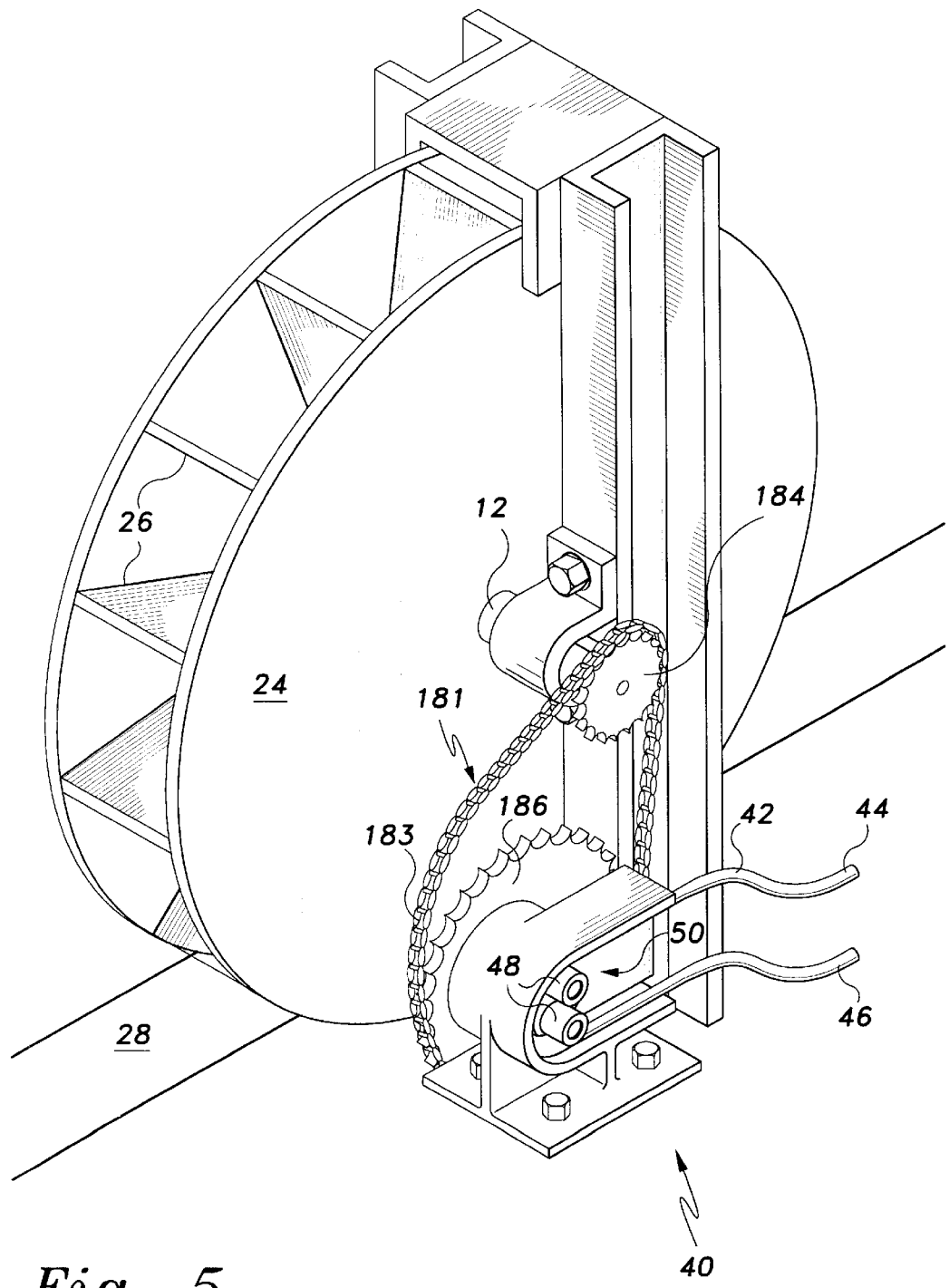
FIG. 5 is a perspective view of an undershot water wheel powering a tube pump.
Figure 8:
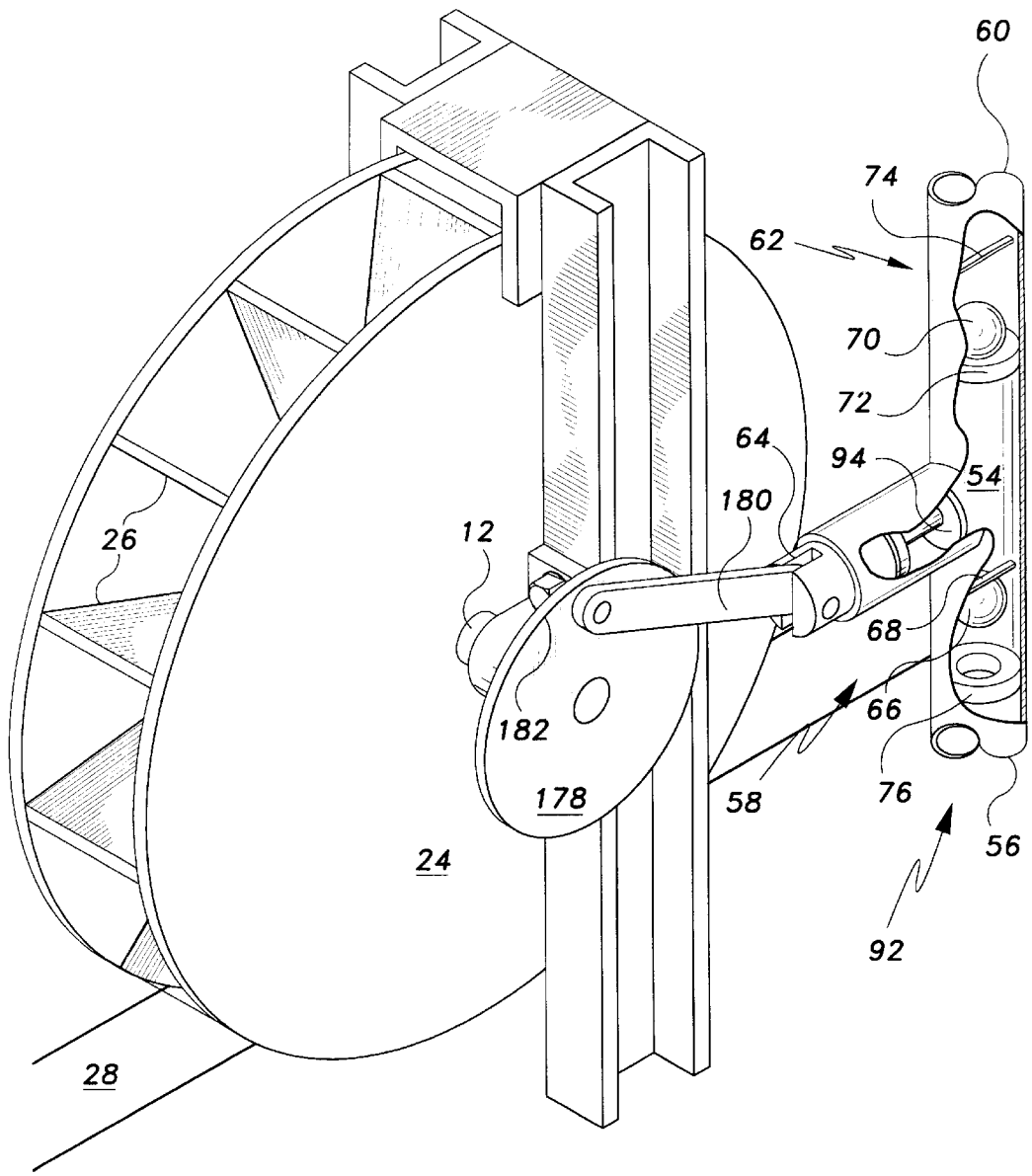
FIG. 8 is a cutaway perspective view of an undershot water wheel powering a diaphragm pump.
Figure 9:
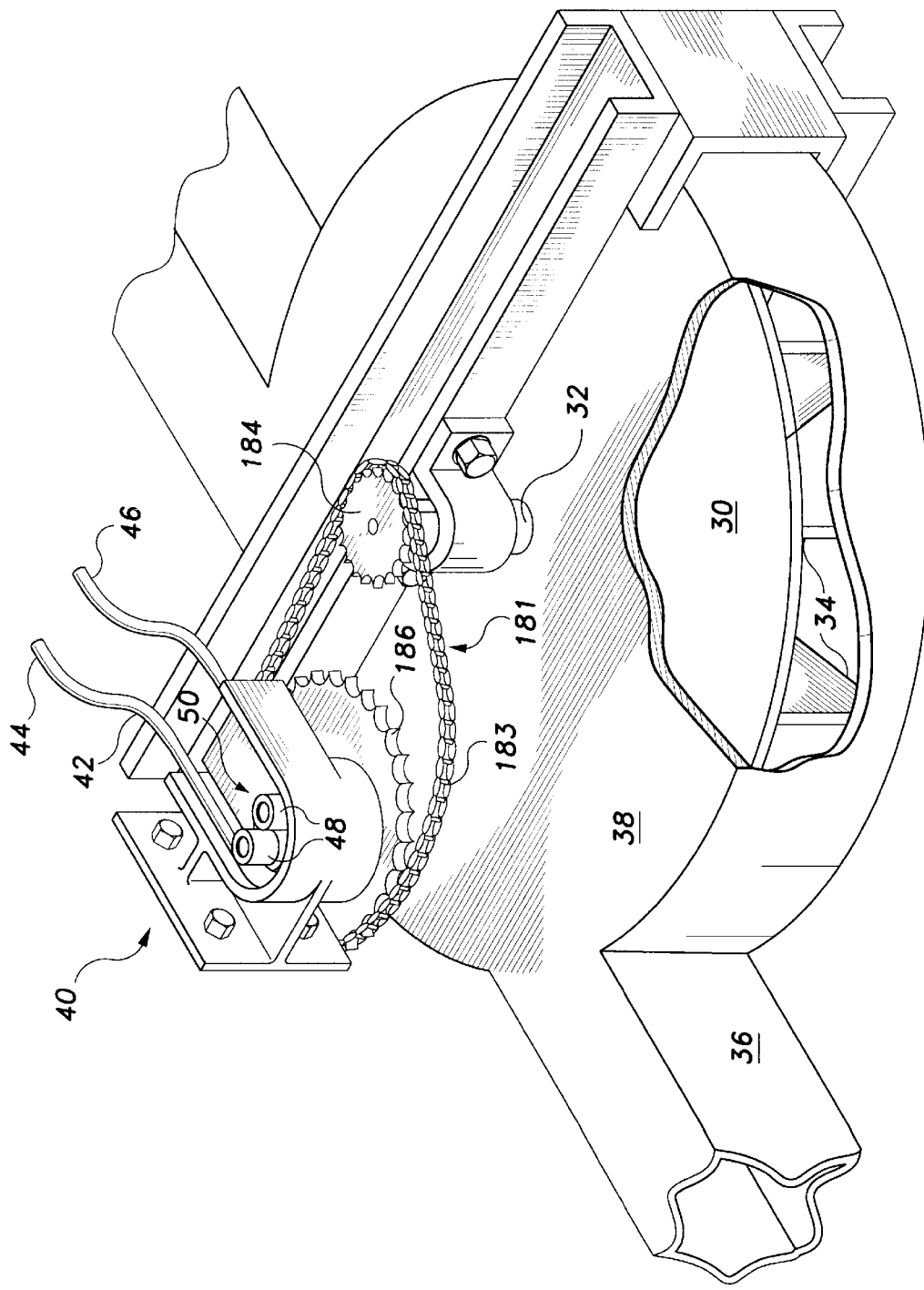
FIG. 9 is a cutaway perspective view of a sideshot water wheel powering a tube pump.
Figure 12:
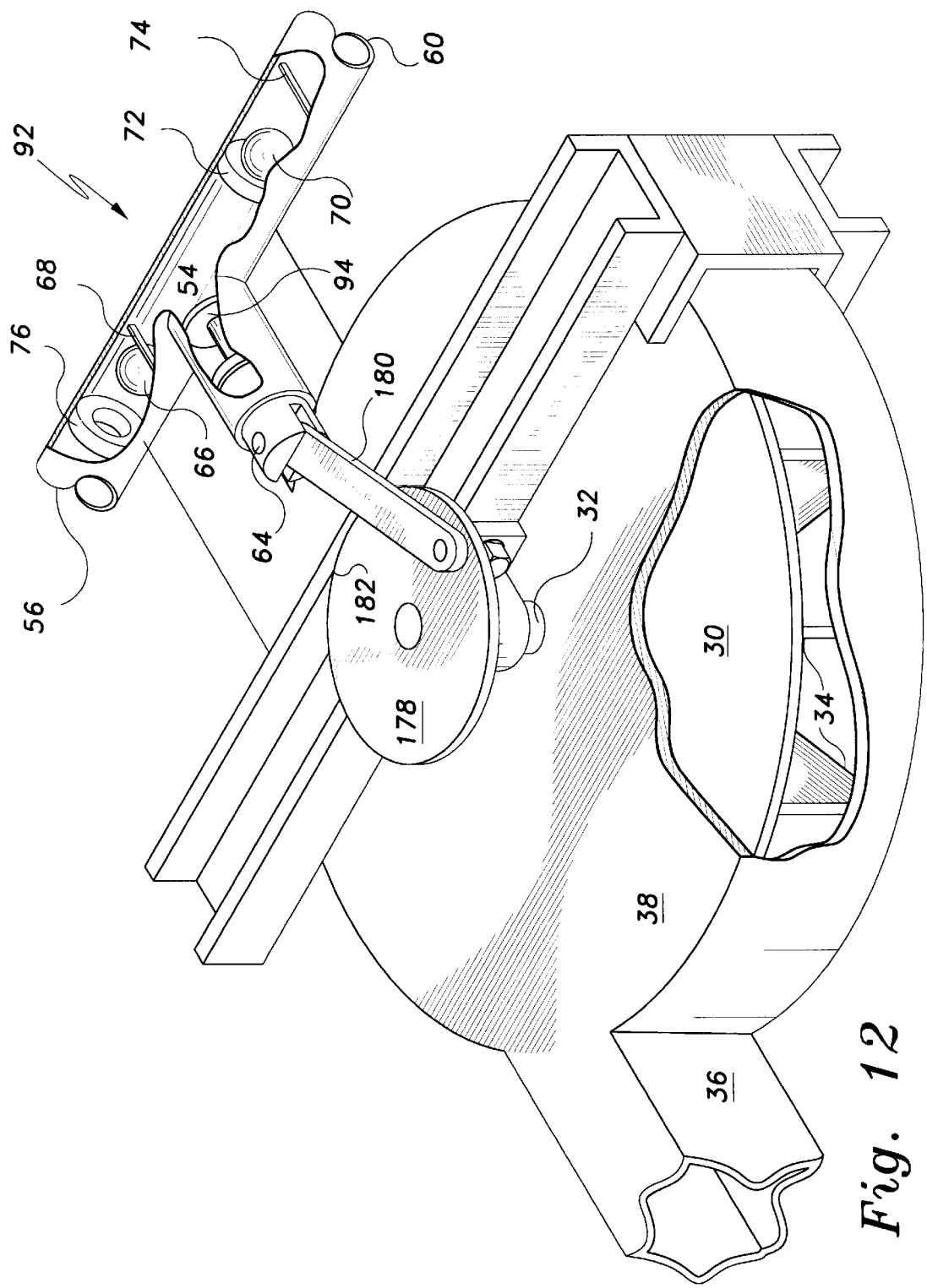
FIG. 12 is a cutaway perspective view of a sideshot water wheel powering a diaphragm pump.

A diaphragm pump 92 is illustrated in FIGS. 4, 8, 12. A diaphragm pump is very similar to a piston pump. Diaphragm pump 92 comprises chamber 54, inlet 56 having one-way ball valve 58, outlet 60 having one-way ball valve 62, piston 64, and diaphragm 94. As piston 64 is drawn away from chamber 54, it draws back diaphragm 94, creating suction. Liquid enters through inlet 56. Ball 66 of valve 58 is drawn against stop 68, opening valve 56. At the same time, ball 70 of valve 62 is drawn against ring 72, preventing fluid flow from the outlet. As piston 64 and diaphragm 94 are drawn towards chamber 54, diaphragm 94 forces liquid out through outlet 60. Ball 70 of valve 62 is pushed against stop 74, allowing liquid to exit. At the same time, ball 66 of valve 58 is forced against stop 76, preventing liquid from exiting through the inlet.

Figure 13:
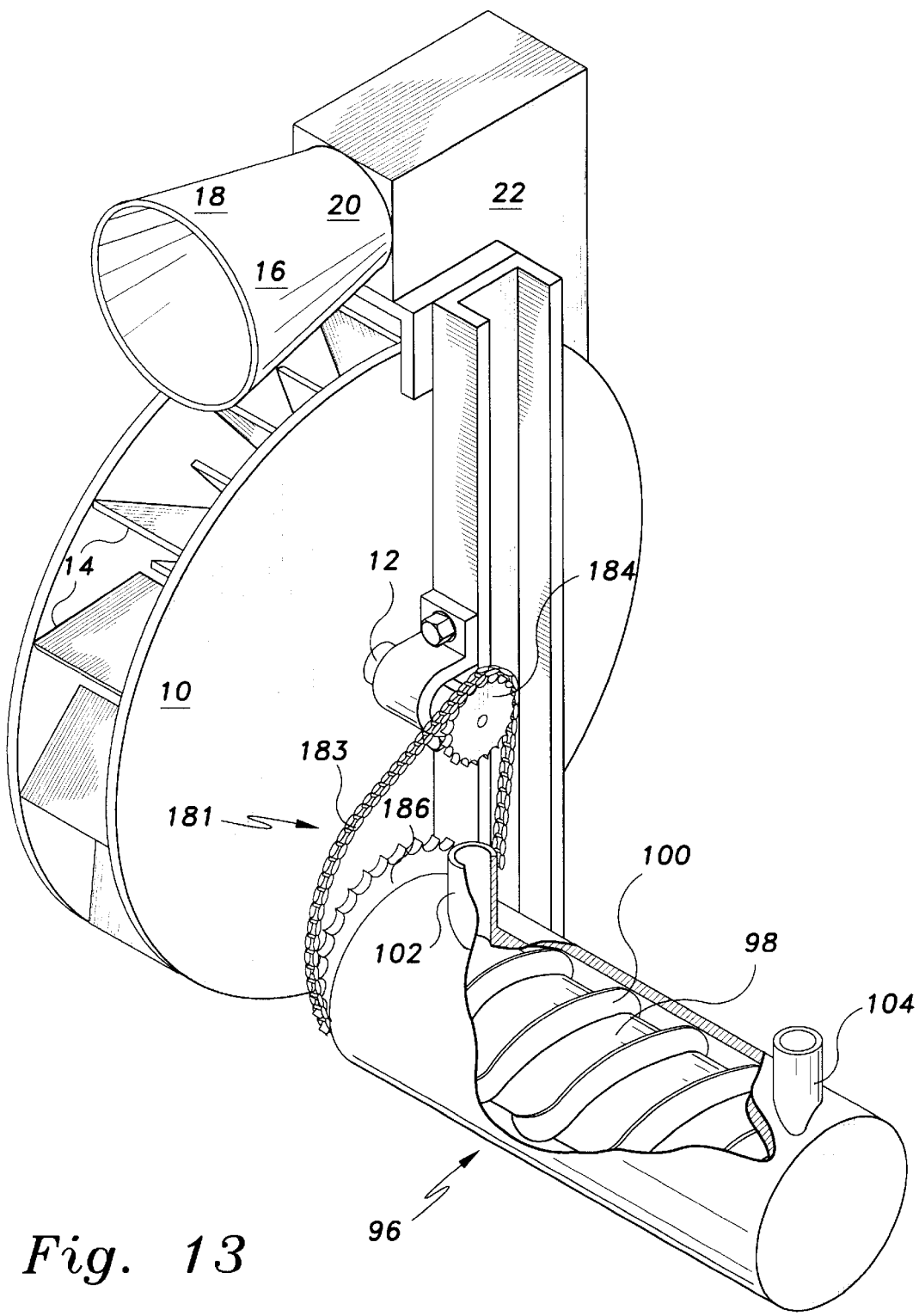
FIG. 13 is a cutaway perspective view of an overshot water wheel powering a progressive cavity pump.
Figure 14:
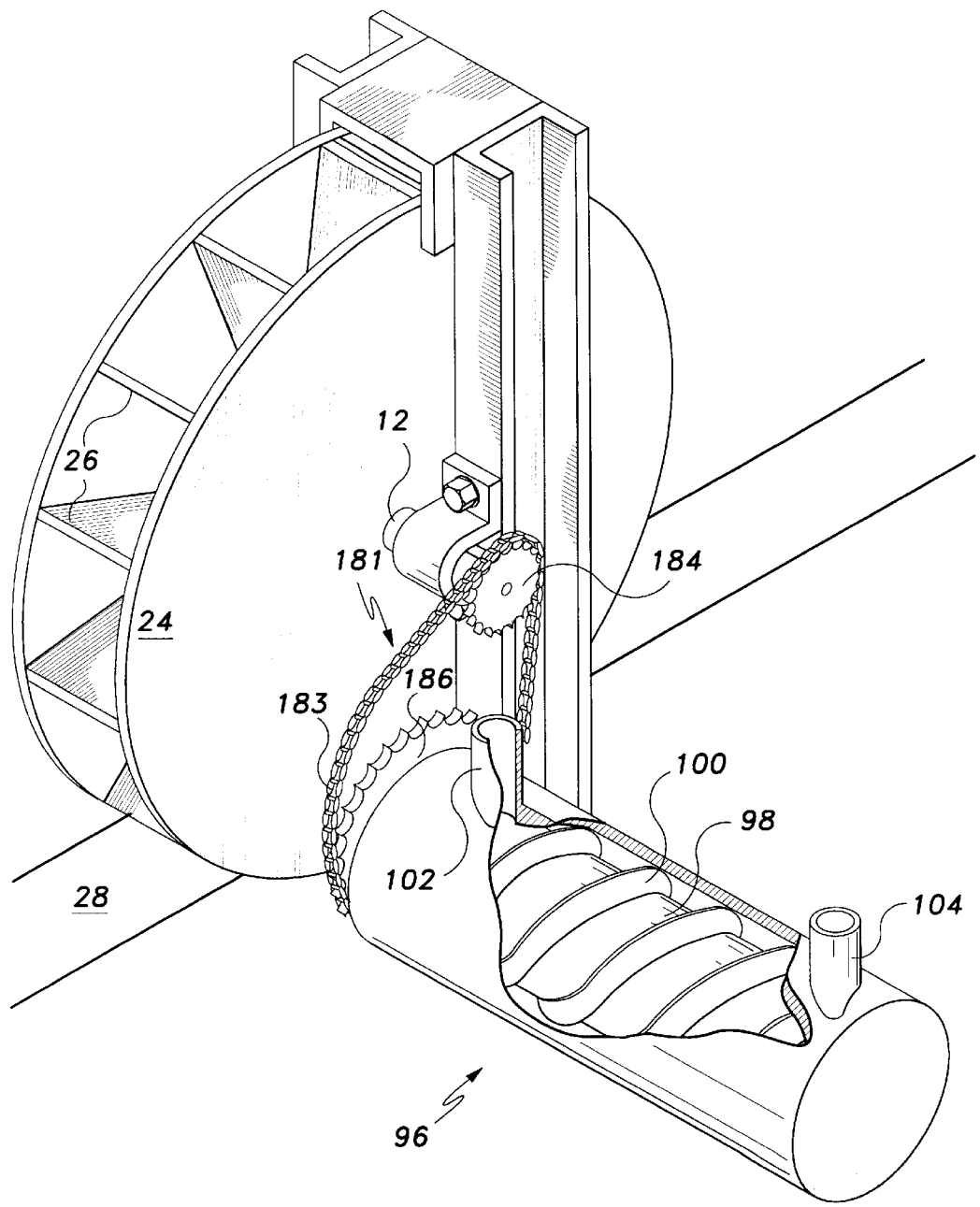
FIG. 14 is a cutaway perspective view of an undershot water wheel powering a progressive cavity pump.
Figure 15:
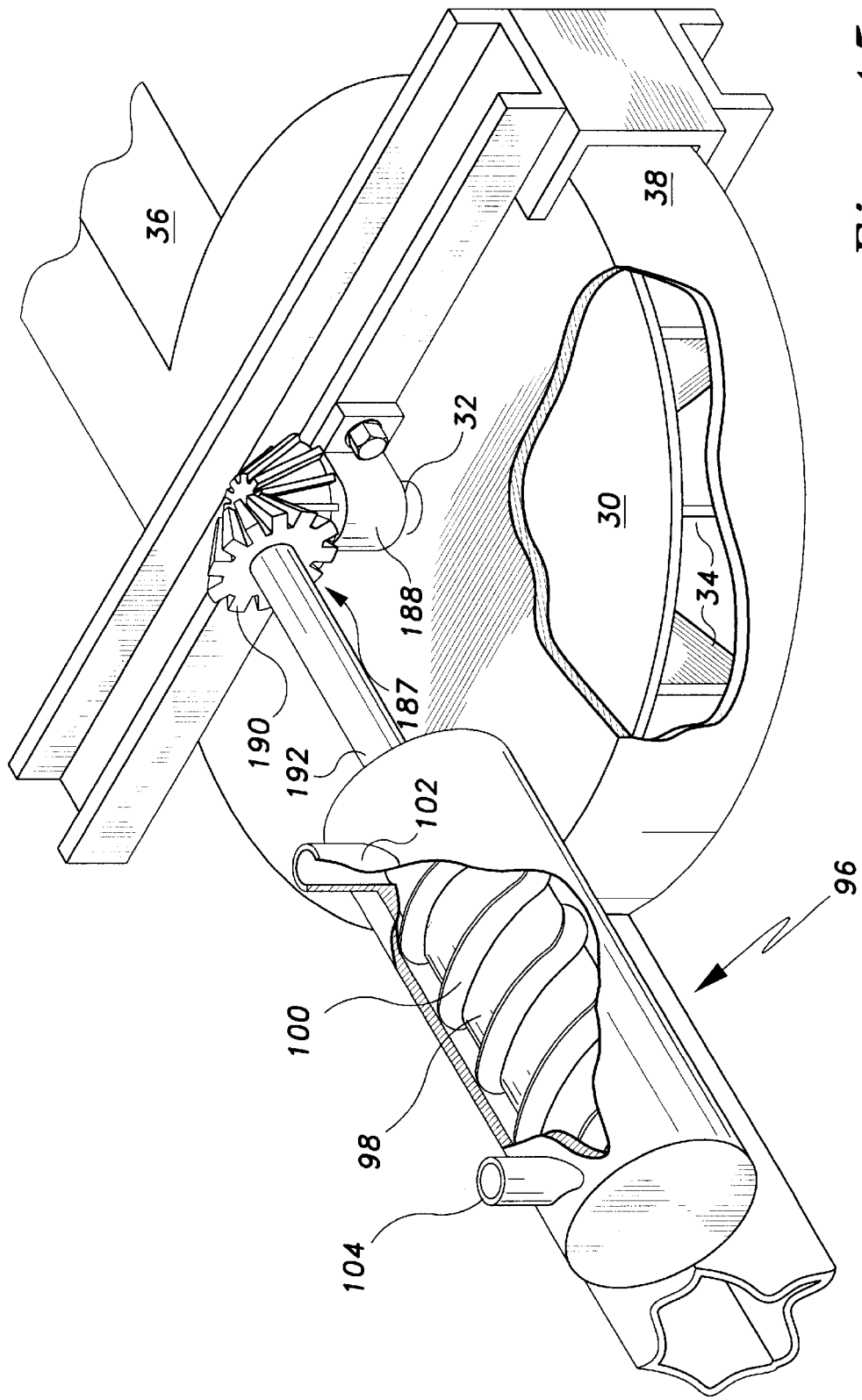
FIG. 15 is a cutaway perspective view of a sideshot water wheel powering a progressive cavity pump.

A progressive cavity pump 96 is illustrated in FIGS. 13, 14, 15. Progressive cavity pump 96 comprises rotor 98, helical tube 100, inlet 102, and outlet 104. Rotor 98 rotates helical tube 100, forcing liquid from inlet 102 to outlet 104.

Figure 16:
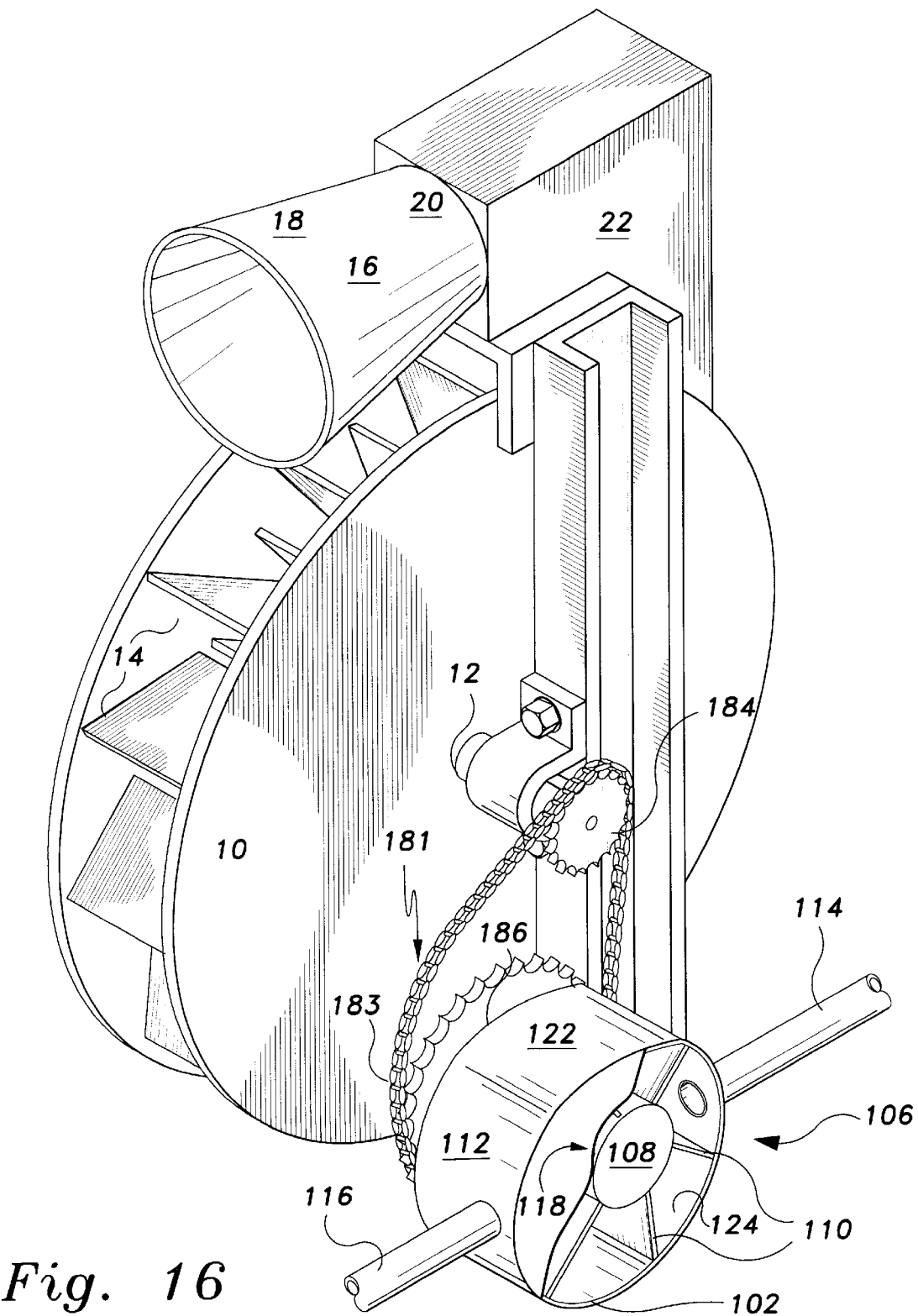
FIG. 16 is a cutaway perspective view of an overshot water wheel powering a rotary vane pump.
Figure 17:
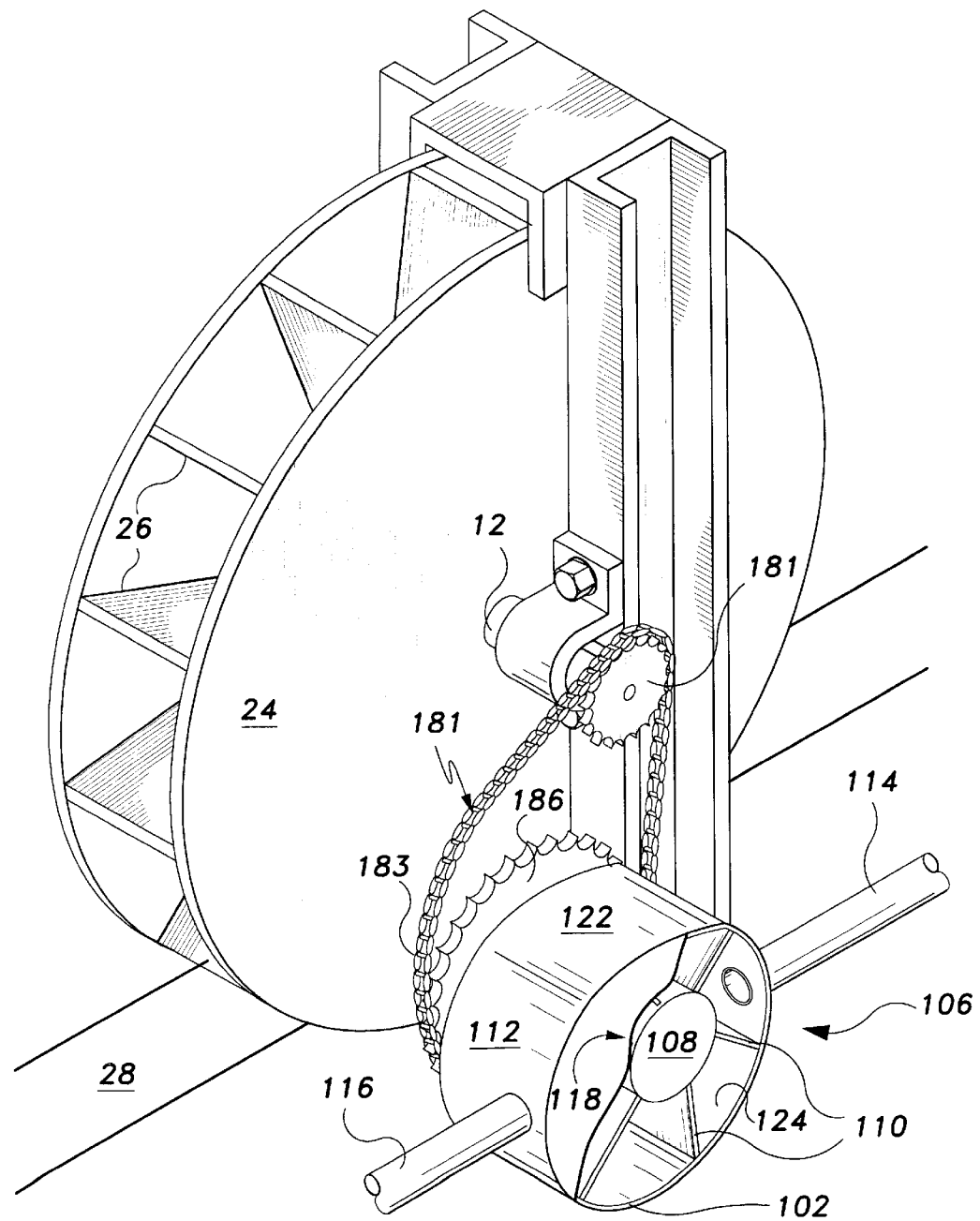
FIG. 17 is a cutaway perspective view of an undershot water wheel powering a rotary vane pump.
Figure 18:
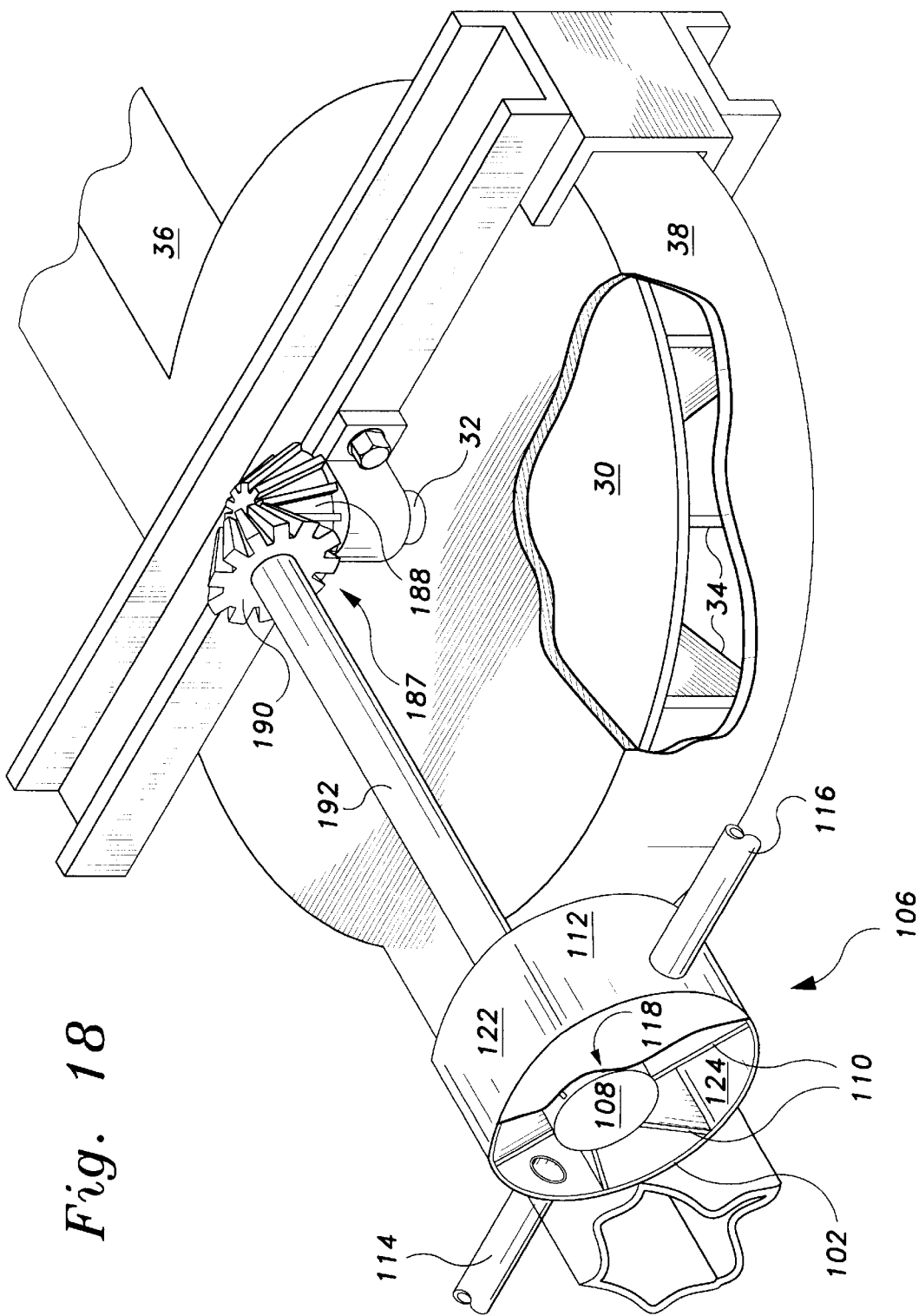
FIG. 18 is a cutaway perspective view of a sideshot water wheel powering a rotary vane pump.

A rotary vane pump 106 is illustrated in FIGS. 16, 17, 18. Rotary vane pump comprises rotor 108, vanes 110, housing 112, inlet 114, and outlet 116. Vanes 110 are slidably held within grooves 118 in housing 112. Housing 112 is generally circular; however, top 122 of housing 112 is flattened. The distance between rotor 108 and bottom 120 of housing 112 is greater than the distance between rotor 108 and top 122 of housing 112. As each vane moves towards bottom 120, it extends from the rotor 108, remaining in contact with housing 112. The chamber 124 formed by housing 112, vanes 110, and rotor 108 increases in size, creating suction. As vane 110 rotates towards top 122, vane 110 retracts into rotor 108. The chamber 124 thereby decreases in size, forcing the liquid out of outlet 116. When the pump 106 is stopped, fluid can not flow past vanes 110.

Figure 19:
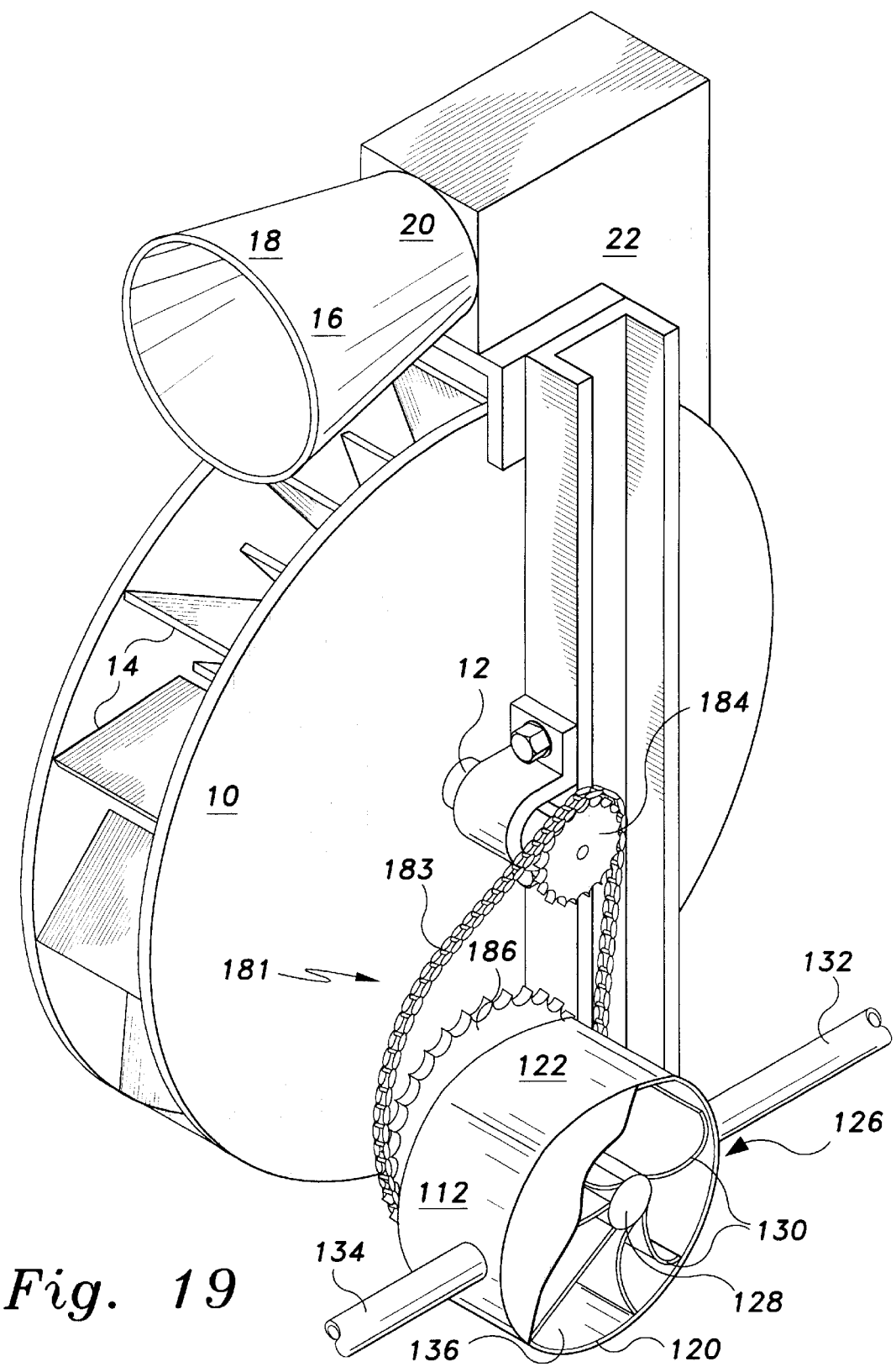
FIG. 19 is a cutaway perspective view of an overshot water wheel powering a flexible impeller pump.
Figure 20:
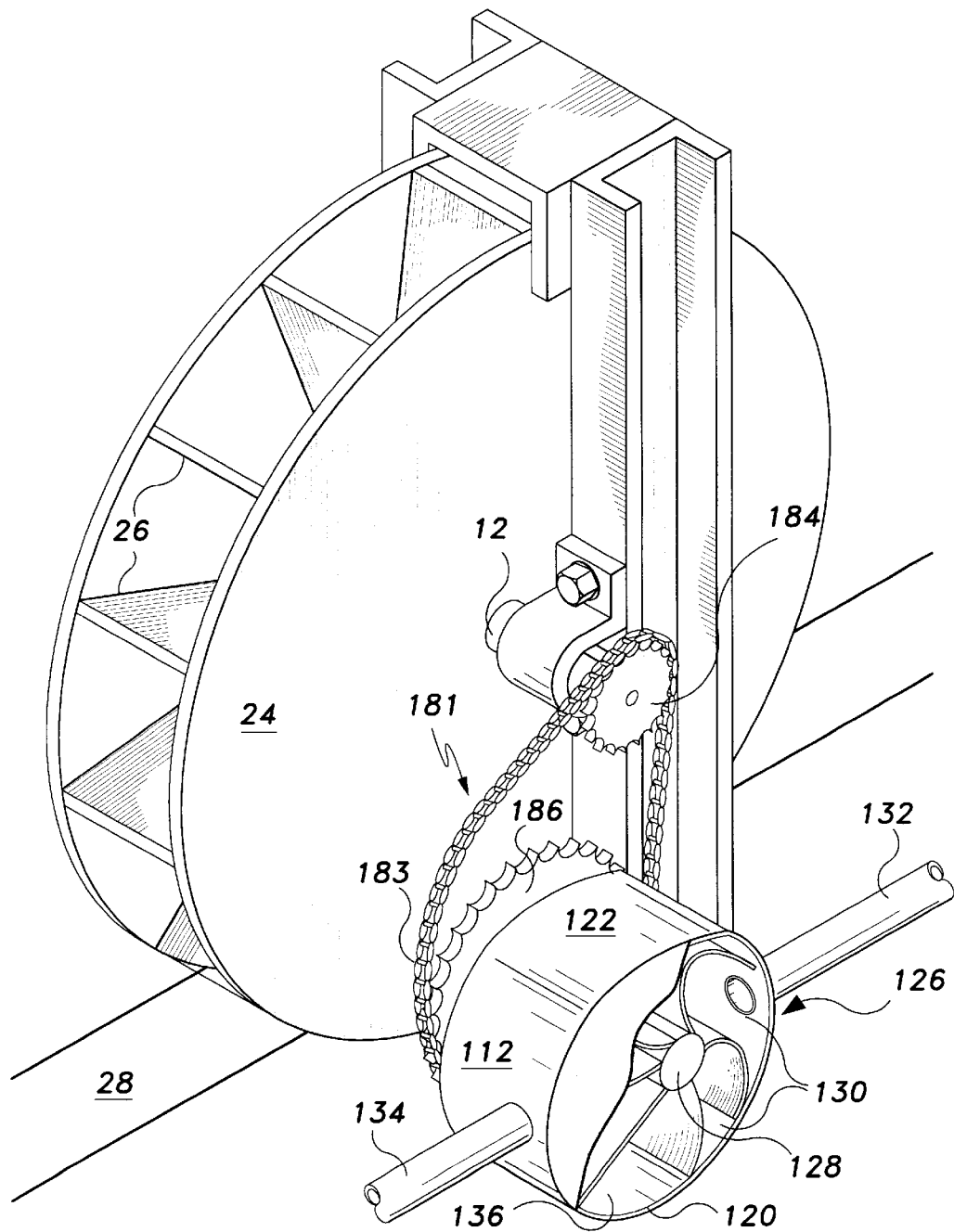
FIG. 20 is a cutaway perspective view of an undershot water wheel powering a flexible impeller pump.
Figure 21:
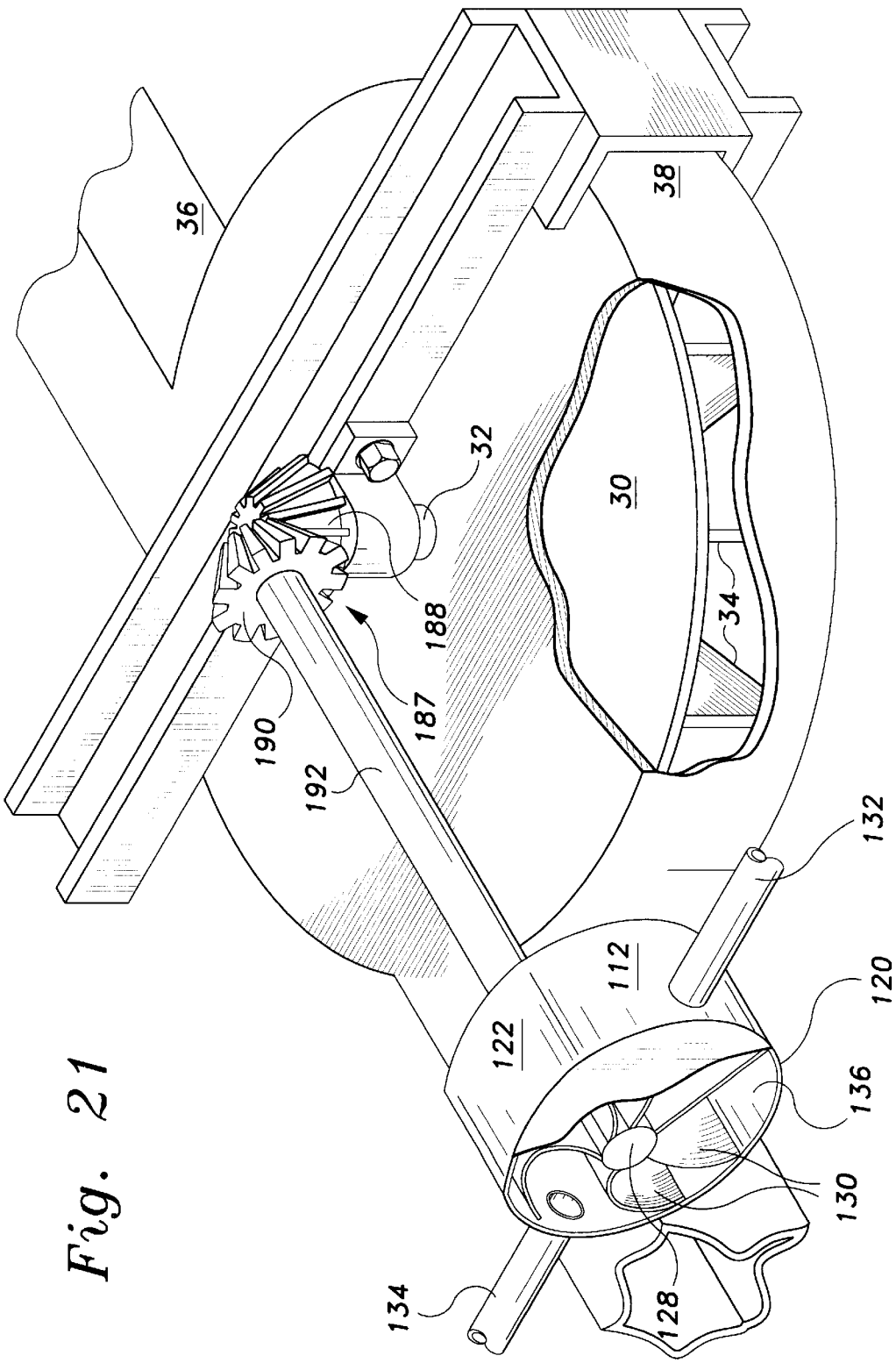
FIG. 21 is a cutaway perspective view of a sideshot water wheel powering a flexible impeller pump.

A flexible impeller pump 126 is illustrated in FIGS. 19, 20, and 21. A flexible impeller pump comprises housing 112, rotor 128, flexible vanes 130, inlet 132, and outlet 134. Housing 112 has the same shape as housing 112 of rotary vane pump 106. Specifically, housing 112 is generally circular, however, top 122 of housing 112 is flattened. Therefore, the distance between rotor 128 and bottom 120 of housing 112 is greater than the distance between rotor 120 and top 122 of housing 112. As flexible vanes 130 move towards bottom 120 of housing 112, vanes 130 straighten, increasing the size of chamber 136 formed by housing 112, vanes 130, and rotor 128, thereby creating suction. As vanes 130 move towards top 122 of housing 112, vanes 130 bend, reducing the size of chamber 136, forcing liquid through the outlet 134. When the pump is stopped, flexible vanes 130 prevent the passage of fluid.

Figure 22:
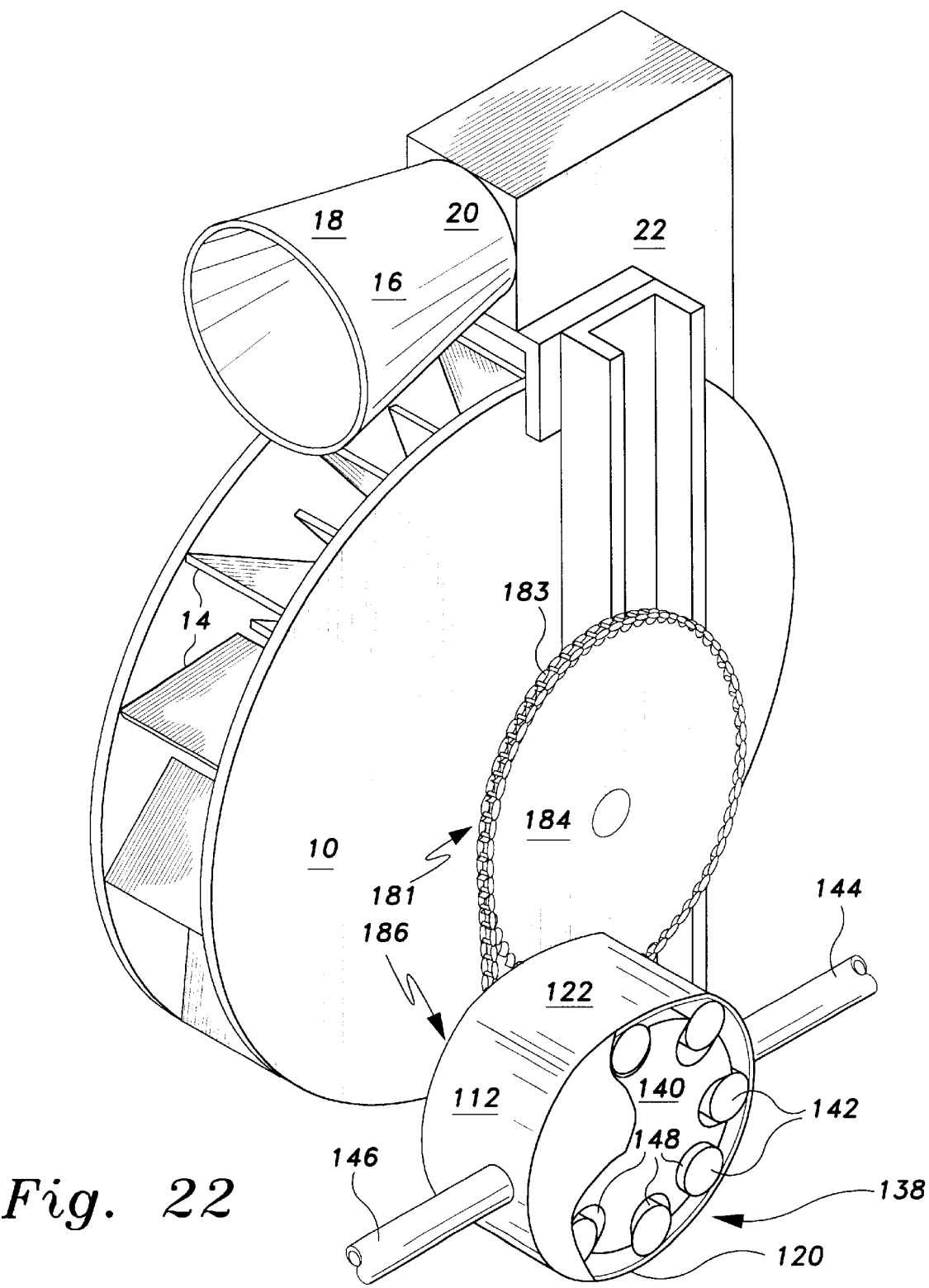
FIG. 22 is a cutaway perspective view of an overshot water wheel powering a roller pump.
Figure 23:
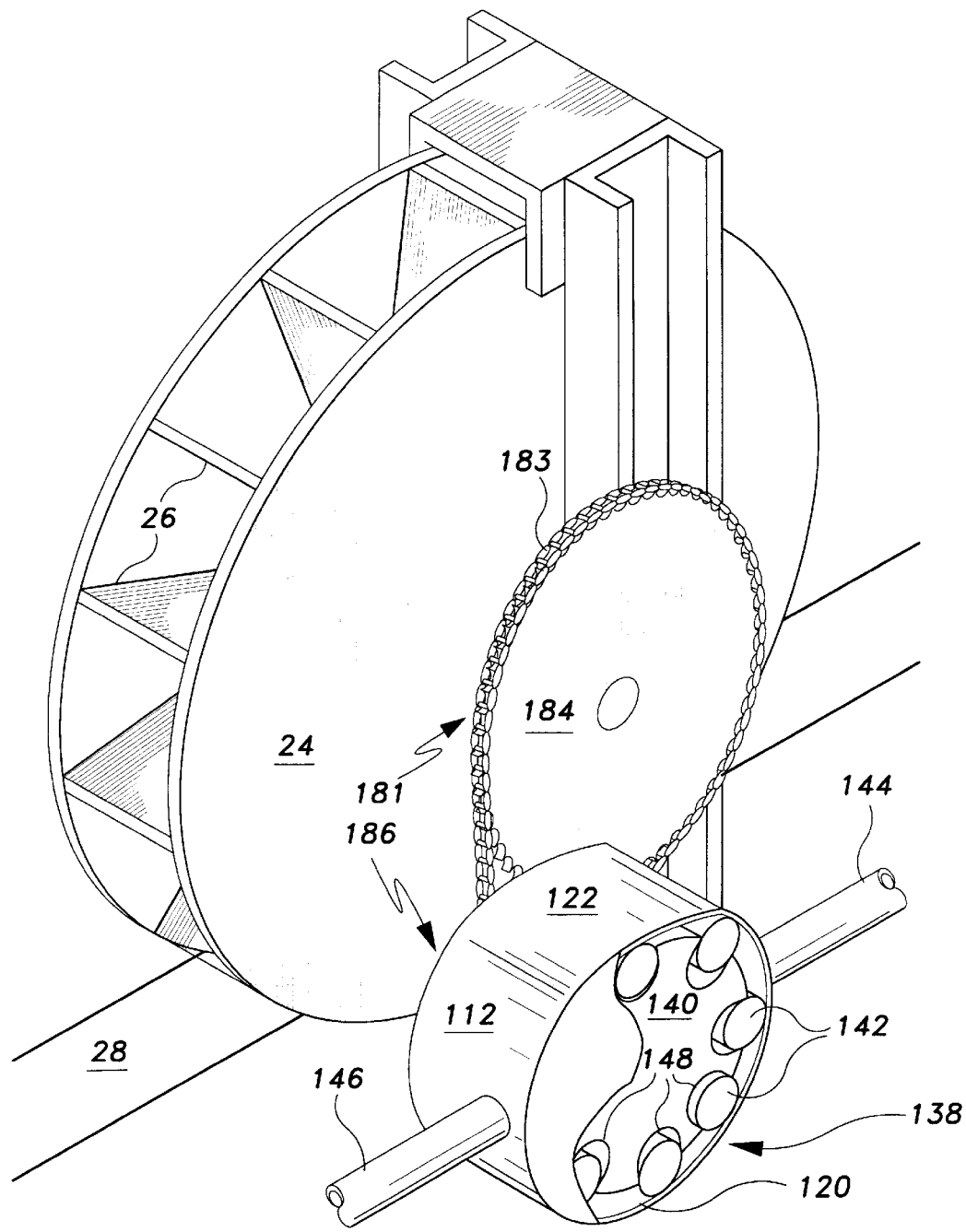
FIG. 23 is a cutaway perspective view of an undershot water wheel powering a roller pump.
Figure 24:
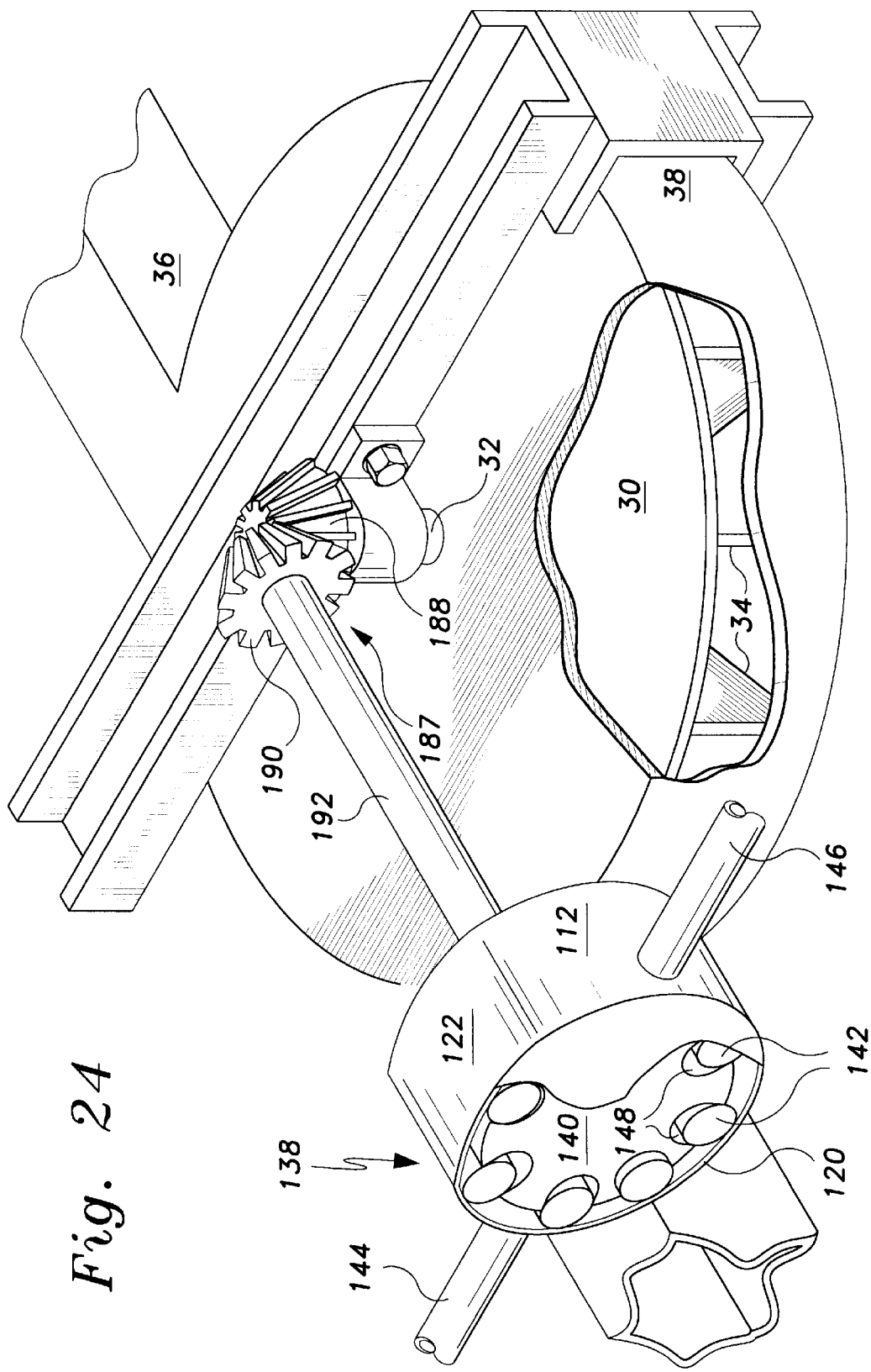
FIG. 24 is a cutaway perspective view of a sideshot water wheel powering a roller pump.

A roller pump 138 is illustrated in FIGS. 22, 23, and 24. Roller pump 138 comprises housing 112, rotor 140, rollers 142, inlet 144, and outlet 146. Housing 112 is similar in shape to the housing of rotary vane pump 106 and flexible impeller pump 126. Specifically, housing 112 is generally circular, however, top 122 of housing 112 is flattened. Therefore, the distance from bottom 120 of housing 112 to rotor 140 is greater than the distance between top 122 of housing 112 and rotor 140. Rollers 142 are contained within channels 148 in rotor 140. As rotor 140 spins, rollers 142 are pressed against housing 112 by centrifugal force. As a roller 142 approaches bottom 120, it is allowed to move away from rotor 140, creating suction in channel 148. As roller 142 approaches top 120, it is forced towards rotor 140, forcing liquid towards outlet 146. To achieve the centrifugal force necessary for this operation, rotor pumps typically operate at a high rate of speed. When the rotor 140 is stopped, the path of liquid proceeding through the pump is blocked by rollers 142, rotor 140, and housing 112.

Figure 25:
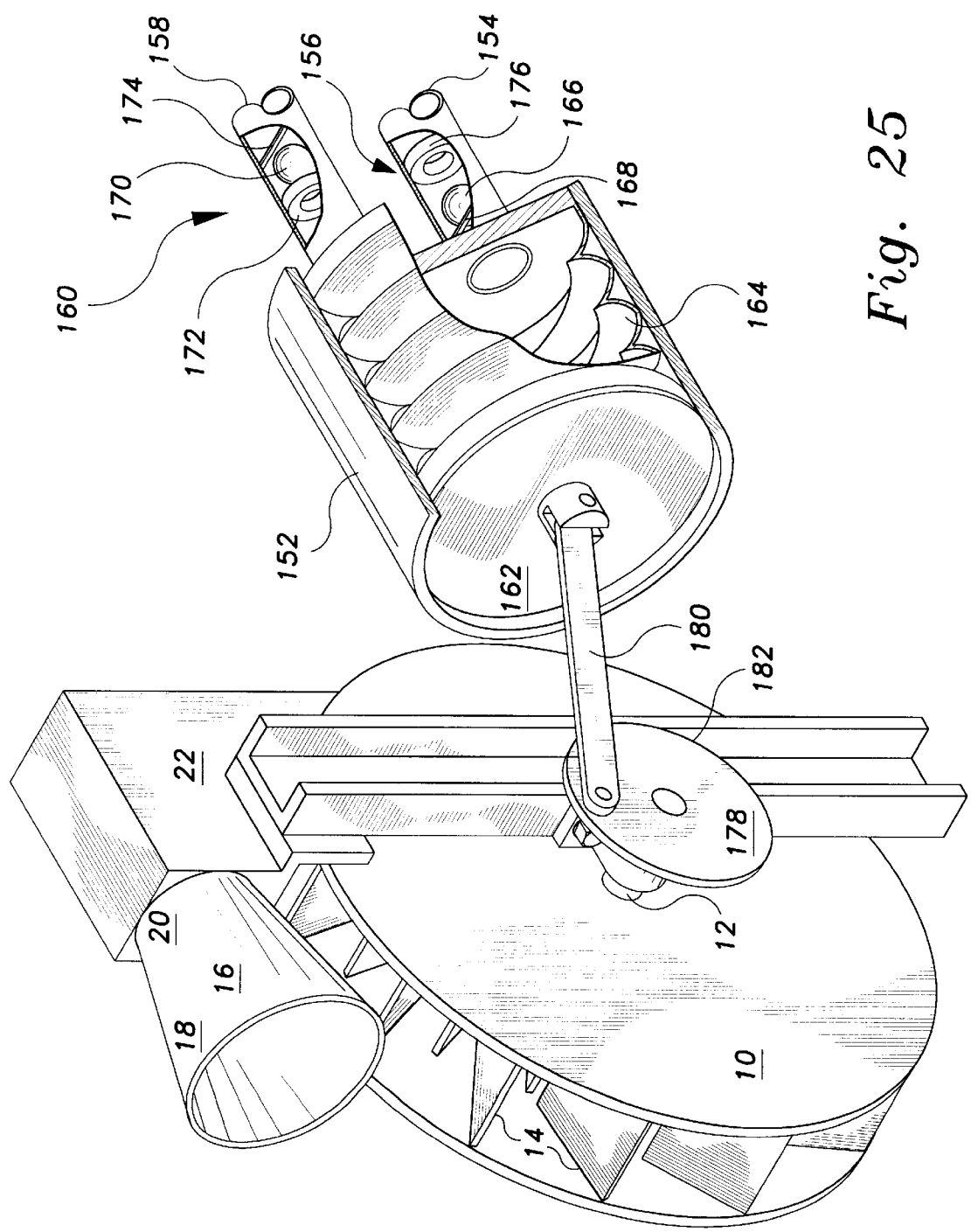
FIG. 25 is a cutaway perspective view of an overshot water wheel powering a bellows pump.
Figure 26:
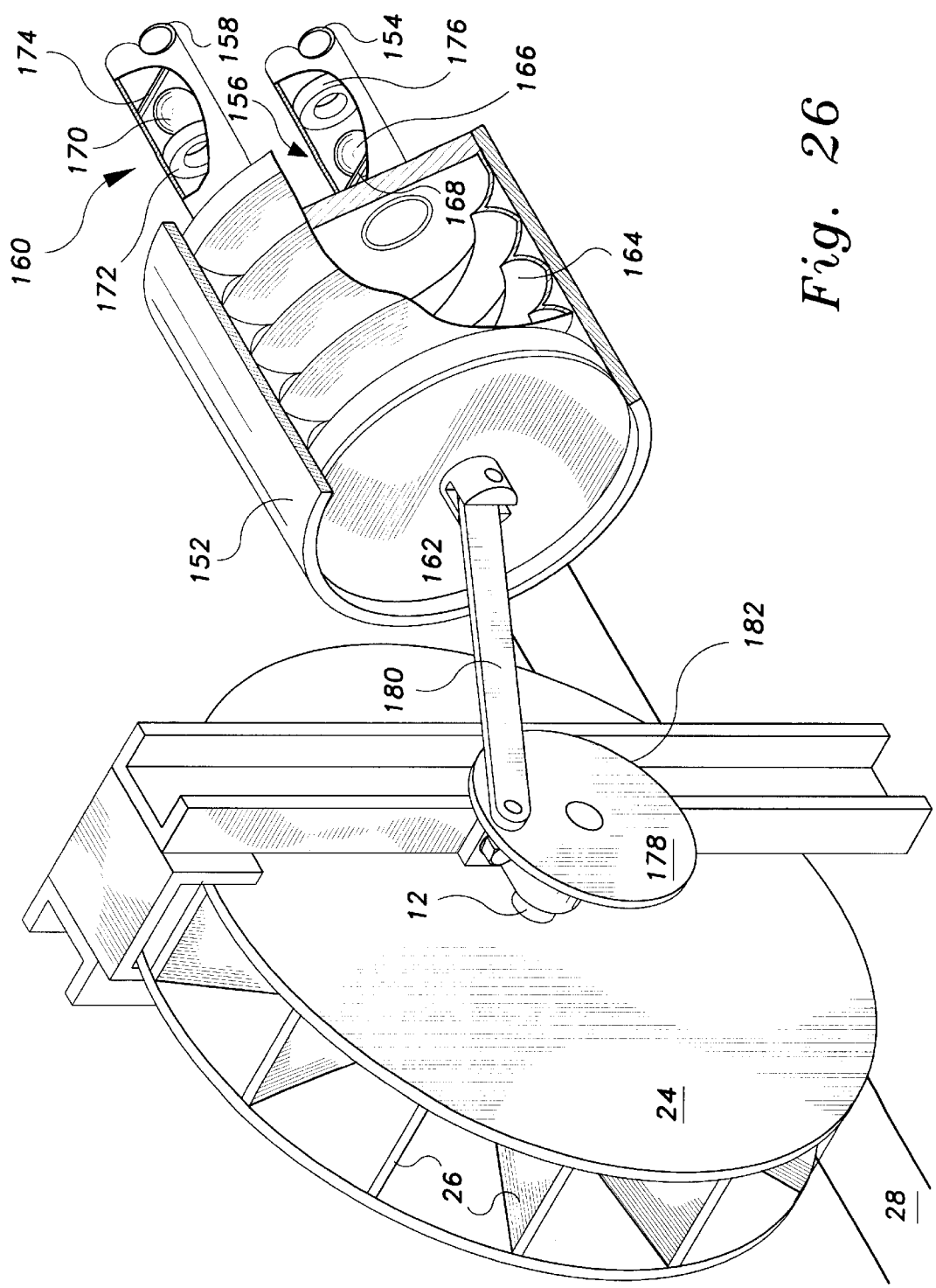
FIG. 26 is a cutaway perspective view of an undershot water wheel powering a bellows pump.
Figure 27:
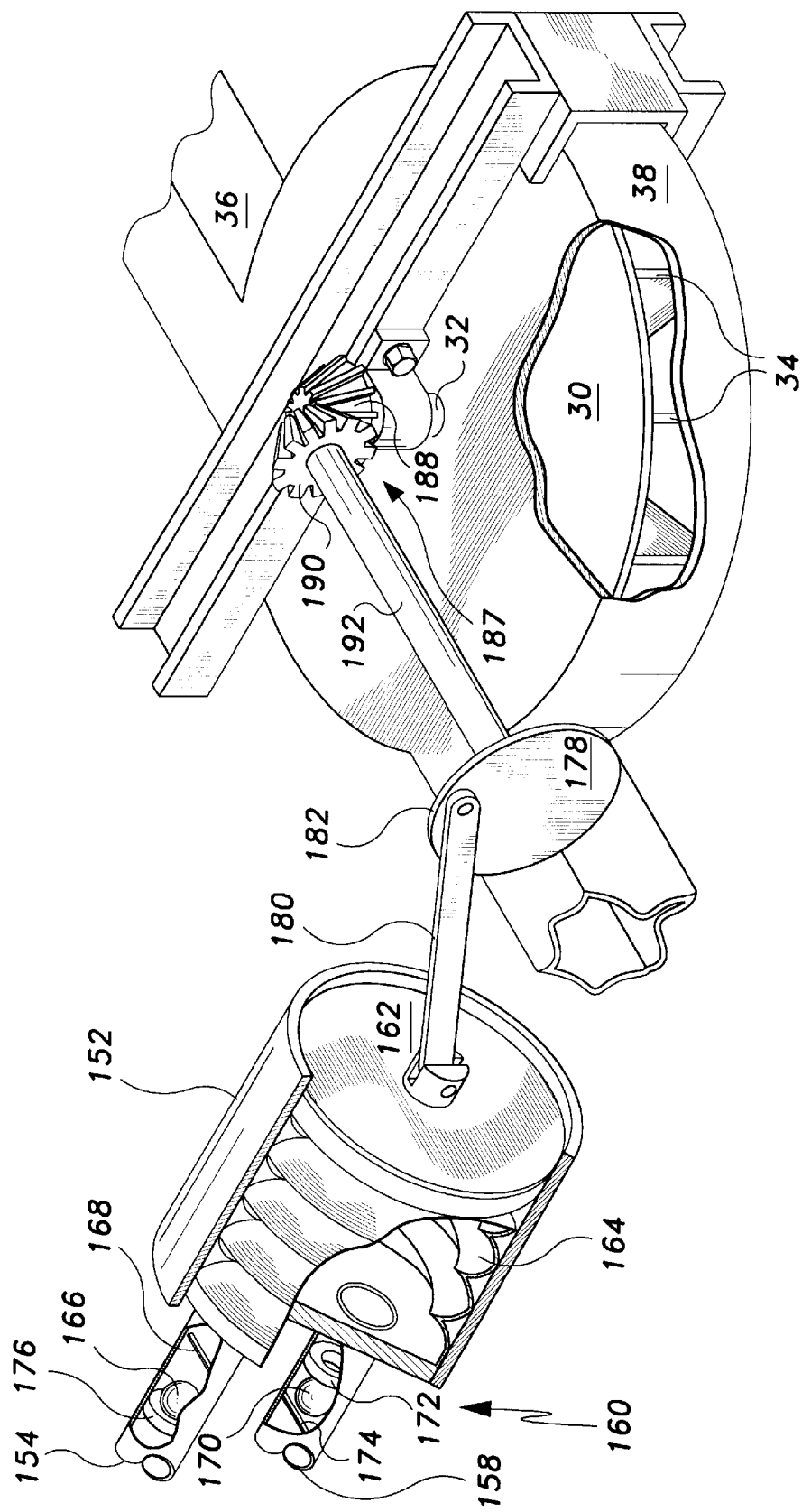
FIG. 27 is a cutaway perspective view of a sideshot water wheel powering a bellows pump.

A bellows pump 150 is illustrated in FIGS. 25, 26, and 27. A bellows pump 150 comprises housing 152, inlet 154 having ball valve 156, outlet 158 having ball valve 160, piston 162, and waterproof bag 164. Piston 162 is attached to bag 164. As piston 162 is drawn outward, it creates suction in bag 164. Ball 166 of inlet valve 156 is drawn against stop 168, opening inlet valve 156. Ball 170 is drawn against ring 172, closing outlet valve 160. Liquid is thereby drawn in only through inlet 154. When piston 162 moves inward, it forces liquid out of bag 162. Ball 170 is pushed against stop 174, opening valve 160 and allowing liquid to leave through outlet 158. Ball 166 is pushed against ring 176, closing inlet valve 156, and preventing liquid from exiting through inlet 154.

Piston pump 52, diaphragm pump 92, and bellows pump 150 all use the same drive means to connect central rotating shaft 12 or 32 with piston 64 or 162. Referring to FIGS. 2, 4, 6, 8, 10, 12, 25, 26, and 27, rotating shafts 12 and 32 are connected concentrically to disk 178. Cam arm 180 is connected at one end to the edge 182 of disk 178, and at the other end to piston 64 and 162. As shaft 12 and 32 rotate, disk 178 rotates at the same speed, moving cam arm 180 in a back and forth reciprocating motion. Water wheel 10, 24, or 30 therefore turns shaft 12 or 32, thereby turning disk 178. Disk 178 moves cam arm 180 in a back and forth reciprocating motion, thereby moving piston 64 or 162 in the same manner.

With the cam arm 180 mounted at the same distance from the edge regardless of radial size of the disk, the radius of disk 178 determines the type of mechanical advantage applied to the pump by the water wheel. A larger radius disk 178 allows for a larger change in the volume of chamber 54 or bag 164, allowing more liquid to be pumped per cycle. A smaller disk allows wheel 10, 24, or 30 to apply greater force to the piston. Size as referred to herein typically refers to radial dimensions of the various wheels, disks and impellers, and the like.

Tube pump 40, gear pump 77, progressive cavity pump 96, rotary vane pump 106, flexible impeller pump 126, and roller pump 138 are all actuated by a rotary motion. Each can therefore be connected to rotating shaft 12 or 32 directly, by means of a gear system, or by means of a chain and sprocket system. FIG. 3 illustrates the direct connection of shaft 12 to gear 78 of gear pump 77. Because gears 78 and 80 mesh, it is only necessary to supply rotational force to one gear to operate gear pump 77.

A chain and sprocket drive means 181 is illustrated in FIGS. 1, 5, 7, 9, 13, 14, 16, 17, 20, 22, and 23. Chain 183 passes around both water wheel sprocket 184 and pump sprocket 186. Water wheel sprocket 184 is connected concentrically to shaft 12. Pump sprocket 186 is connected concentrically with the pump drive means, which may be the rotor 50 of tube pump 40, gear 78 or 80 of gear pump 77, rotor 98 of progressive cavity pump 96, rotor 108 of rotary vane pump 106, rotor 128 of flexible impeller pump 126, or rotor 140 of roller pump 138. The turning of water wheel 10, 24, or 30 thereby turns wheel sprocket 184, moving chain 183 across sprockets 184 and 186, turning pump sprocket 186, thereby turning either the rotor 50 of tube pump 40, gear 78 or 80 of gear pump 77, rotor 98 of progressive cavity pump 96, rotor 108 of rotary vane pump 106, rotor 128 of flexible impeller pump 126, or rotor 140 of roller pump 138.

The size of the water wheel sprocket 184 relative to the pump sprocket 186 determines the mechanical advantage applied to the pump. For example, referring to FIG. 1, Pump sprocket 186 has six times as many teeth as water wheel sprocket 184. Water wheel 10 therefore rotates six times for every complete rotation of rotor 50. Water wheel 10 therefore applies a great deal of force to tube pump 40, which is necessary to compress tube 42. Conversely, referring to FIG. 22, water wheel sprocket 184 is large compared to pump sprocket 186. Rotor 140 will therefore complete several rotations for every one rotation of water wheel 10. Water wheel 10 therefore does not apply a great deal of force to pump 138, but does allow pump 138 to operate at a relatively high speed. Rotor pump 138 requires a high speed to generate the centrifugal force necessary to drive rollers 142 against housing 112, ensuring proper generation of suction in channels 148.

A gear system 187 is illustrated in FIGS. 11, 15, 18, 21, 24, and 27. The water wheel's shaft 32 is connected concentrically to water wheel gear 188, which meshes with pump gear 190. Pump gear 190 is connected concentrically with one end of pump drive shaft 192, which is connected concentrically at its other end with the pump drive means, which may be the rotor 50 of tube pump 40, gear 78 or 80 of gear pump 77, rotor 98 of progressive cavity pump 96, rotor 108 of rotary vane pump 106, rotor 128 of flexible impeller pump 126, or rotor 140 of roller pump 138. Water wheel 10, 24, or 30 therefore turns shaft 12 or 32, turning water wheel gear 188. Water wheel gear 188 turns pump gear 190, turning pump drive shaft 192. Pump drive shaft 192 thereby turns either the rotor 50 of tube pump 40, gear 78 or 80 of gear pump 77, rotor 98 of progressive cavity pump 96, rotor 108 of rotary vane pump 106, rotor 128 of flexible impeller pump 126, or rotor 140 of roller pump 138.

In a manner similar to the chain and sprocket system 181 described above, varying the number of teeth in each gear relative to the other gear will change the mechanical advantage of the water wheel acting on the pump. For example, referring to FIG. 24, it may be desirable to make water wheel gear 188 large compared to pump gear 190, so that one rotation of water wheel 30 results in several rotations of pump rotor 140. Conversely, making water wheel gear 188 small relative to pump gear 190 will result in one rotation of the pump rotor for several rotations of the water wheel, allowing the water wheel to apply a large amount of force to the pump.

Figure 28:
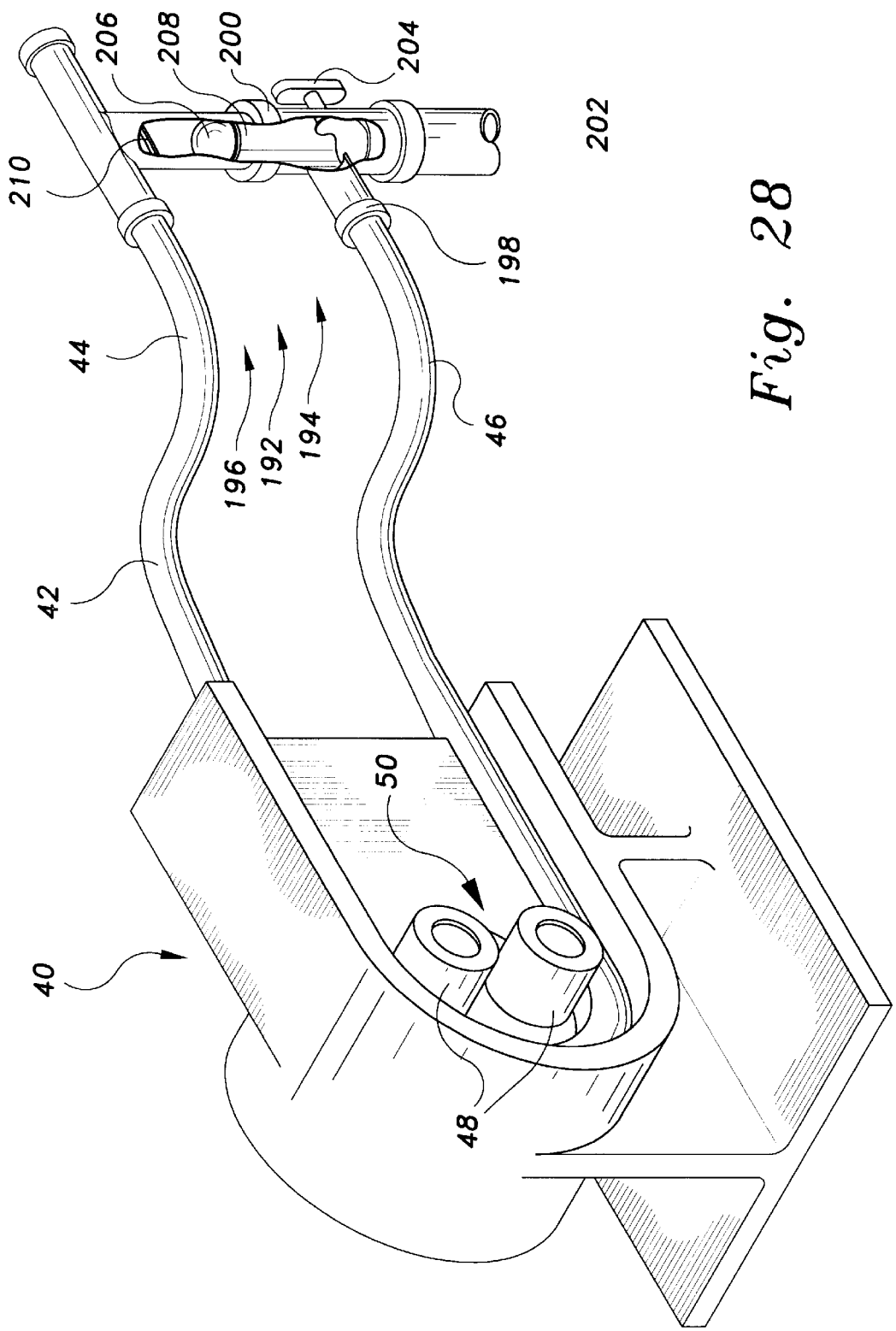
FIG. 28 is a cutaway perspective view of a tube pump connected to a diverter valve.

Referring to FIG. 28, a recirculation assembly 192 for regulating pump output with a constant speed water wheel is shown. Although the recirculation assembly 192 is shown connected to tube pump 40, it will work with any of the pumps described above. The recirculation assembly 192 comprises three way diverter valve 194, and one way ball valve 196. Diverter valve 194 includes one inlet 198, connected to pump output 46, a recirculation outlet 200, connected to the inlet of ball valve 196, a second outlet 202, leading towards the desired destination of the pumped chemicals, and handle 204. Handle 204 rotates between a first position wherein recirculation outlet 200 is totally blocked and all liquid pumped is discharged into the water, and a second position wherein outlet 202 is totally blocked and all liquid pumped is recirculated. One-way ball valve 196 is connected between recirculation outlet 200 of diverter valve 194, and pump inlet 44. Fluid traveling towards diverter valve 194 drives ball 206 against ring 208, closing ball valve 196. Fluid traveling towards pump inlet 44 drives ball 206 against bar 210, opening valve 196. Ball valve 196 prevents chemicals from bypassing pump 40 and discharging into the water when pump 40 is stopped. Rotating handle 204 determines the amount of chemical discharged, and recirculates the remaining chemical passing through pump 40.

It is to be understood that the present invention is not limited to the embodiments described above, but encompasses any and all embodiments within the scope of the following claims.

I claim:

1. An apparatus for pumping chemical treatment into a water stream comprising:
    a water path;
    a water wheel having a central rotational shaft, and an edge at least partially contained within said water path;
    a pump having an inlet, an outlet, and a suction means; and
    a drive means connected between said central rotational shaft and said suction means;
    a three way diverter valve having an intake, a first outlet, a second outlet, and a handle, said handle being rotatable between a first position wherein said first outlet is blocked, and a second position wherein said second outlet is blocked, said intake connected to said pump's outlet; and
    a one-way valve having an inlet and an outlet, said inlet connected to said diverter valve's first outlet; said outlet connected to said pump's inlet.

2. The apparatus for pumping chemical treatment into a water stream according to claim 1 wherein:
    said water wheel rotates within a substantially vertical plane; and
    said water path is vertical.

3. The apparatus for pumping chemical treatment into a water stream according to claim 1, wherein:
    said water wheel rotates within a substantially vertical plane; and
    said water path is horizontal.

4. The apparatus for pumping chemical treatment into a water stream according to claim 1, wherein said water wheel rotates within a horizontal axis.

5. The apparatus for pumping chemical treatment into a water stream according to claim 1, wherein said pump is a tube pump.

6. The apparatus for pumping chemical treatment into a water stream according to claim 1, wherein said pump is a piston pump.

7. The apparatus for pumping chemical treatment into a water stream according to claim 1, wherein said pump is a gear pump.

8. The apparatus for pumping chemical treatment into a water stream according to claim 1, wherein said pump is a diaphragm pump.

9. The apparatus for pumping chemical treatment into a water stream according to claim 1, wherein said pump is a progressive cavity pump.

10. The apparatus for pumping chemical treatment into a water stream according to claim 1, wherein said pump is a rotary vane pump.

11. The apparatus for pumping chemical treatment into a water stream according to claim 1, wherein said pump is a flexible impeller pump.

12. The apparatus for pumping chemical treatment into a water stream according to claim 1, wherein said pump is a roller pump.

13. The apparatus for pumping chemical treatment into a water stream according to claim 1, wherein said pump is a bellows pump.

14. The apparatus for pumping chemical treatment into a water stream according to claim 1, wherein said drive means is said central rotating shaft connected directly to said suction means.

15. The apparatus for pumping chemical treatment into a water stream according to claim 1, wherein said drive means is a chain and sprocket assembly having a first sprocket connected to said central rotational shaft, and a second sprocket connected to said suction means.

16. The apparatus for pumping chemical treatment into a water stream according to claim 1, wherein said drive means comprises at least two intermeshing gears.

17. The apparatus for pumping chemical treatment into a water stream according to claim 1 wherein said water path has a tapered water inlet portion, narrowing towards said water wheel.

18. The apparatus for pumping chemical treatment into a water stream according to claim 1 wherein said water path contains water having a low pressure.

19. An apparatus for pumping chemical treatment into a water stream consisting of:
    a water path;
    a water wheel having a central rotational shaft, and an edge at least partially contained within said water path;
    a pump having an inlet, an outlet, and a suction means; and
    a drive means connected between said central rotational axis and said suction means;
    a three way diverter valve having an intake, a first outlet, a second outlet, and a handle, said handle being rotatable between a first position wherein said first outlet is blocked, and a second position wherein said second outlet is blocked, said intake connected to said pump's outlet; and
    a one-way valve having an inlet and an outlet, said inlet connected to said diverter valve's first outlet; said outlet connected to said pump's inlet.

* * * * *